US012615532B2

(12) United States Patent
Cui et al.

(10) Patent No.: US 12,615,532 B2
(45) Date of Patent: Apr. 28, 2026

(54) RADIO RESOURCE MANAGEMENT MEASUREMENT PRIORITIZATION FOR REDUCED CAPACITY USER EQUIPMENT

(71) Applicant: Apple Inc., Cupertino, CA (US)

(72) Inventors: Jie Cui, San Jose, CA (US); Hong He, San Jose, CA (US); Yang Tang, San Jose, CA (US); Qiming Li, Beijing (CN); Xiang Chen, Campbell, CA (US); Manasa Raghavan, Sunnyvale, CA (US); Dawei Zhang, Saratoga, CA (US); Huaning Niu, San Jose, CA (US); Chunxuan Ye, San Diego, CA (US); Haitong Sun, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/440,578

(22) PCT Filed: Aug. 4, 2021

(86) PCT No.: PCT/CN2021/110573

§ 371 (c)(1),
(2) Date: Sep. 17, 2021

(87) PCT Pub. No.: WO2023/010338

PCT Pub. Date: Feb. 9, 2023

(65) Prior Publication Data

US 2024/0172018 A1 May 23, 2024

(51) Int. Cl.
H04W 24/10 (2009.01)
H04L 5/00 (2006.01)
(Continued)

(52) U.S. Cl.
CPC ........... H04W 24/10 (2013.01); H04W 72/51 (2023.01); H04W 72/566 (2023.01)

(58) Field of Classification Search
CPC .... H04W 24/10; H04W 72/51; H04W 72/566
(Continued)

(56) References Cited

U.S. PATENT DOCUMENTS

2015/0099523 A1 4/2015 Yang et al.
2020/0112978 A1 4/2020 Zhang et al.
(Continued)

FOREIGN PATENT DOCUMENTS

CN 105637928 A 6/2016
CN 109587711 A 4/2019
(Continued)

OTHER PUBLICATIONS

International Search Report and Written Opinion of the International Searching Authority directed to related International Application No. PCT/CN2021/110573, mailed on Apr. 24, 2022, 9 pages.
(Continued)

*Primary Examiner* — Xuan Lu
(74) *Attorney, Agent, or Firm* — STERNE, KESSLER, GOLDSTEIN & FOX P.L.L.C.

(57) ABSTRACT

Some aspects include an apparatus, method, and computer program product for radio resource management measurement prioritization for reduced capacity (RedCap) user equipment (UE). A RedCap UE may be use Half-Duplex Frequency Division Duplex (HD-FDD) for wireless communications. When performing communications with a network, the RedCap UE may make several measurements, including Reference Signal Received Power (RSRP), Signal to Interference and Noise Ratio (SINR), and Reference Signal Received Quality (RSRQ) measurements. To obtain these measurements, the RedCap UE may measure Synchronization Signal Block (SSB), Received Signal Strength Indicator (RSSI), and/or Channel State Information Reference Signal (CSI-RS) symbols. Difficulties may arise when (Continued)

a RedCap UE's serving cell signal timing is not synchronized with a neighboring cell. The RedCap UE may be configured to prioritize measurements over uplink transmissions. This prioritization may also include symbol buffers so that an overlap in uplink transmissions does not occur during a measurement.

16 Claims, 17 Drawing Sheets

(51) Int. Cl.

| | |
|---|---|
| *H04L 5/14* | (2006.01) |
| *H04L 5/16* | (2006.01) |
| *H04L 27/26* | (2006.01) |
| *H04W 56/00* | (2009.01) |
| *H04W 72/51* | (2023.01) |
| *H04W 72/566* | (2023.01) |

(58) Field of Classification Search
USPC ......................................................... 370/252
See application file for complete search history.

(56) References Cited

U.S. PATENT DOCUMENTS

| | | | |
|---|---|---|---|
| 2020/0229017 | A1 | 7/2020 | Liu et al. |
| 2021/0235398 | A1 | 7/2021 | Zhang et al. |
| 2021/0297884 | A1* | 9/2021 | Harada ................ H04B 17/382 |
| 2021/0329513 | A1* | 10/2021 | Babaei ............. H04W 36/0085 |
| 2021/0385765 | A1 | 12/2021 | Cheng et al. |
| 2022/0014953 | A1* | 1/2022 | Teyeb ................... H04W 24/10 |
| 2022/0104224 | A1* | 3/2022 | Choi ..................... H04L 5/0055 |
| 2022/0279427 | A1* | 9/2022 | Hwang ................ H04W 48/16 |
| 2023/0051987 | A1* | 2/2023 | Harada ................ H04W 24/08 |
| 2023/0284160 | A1* | 9/2023 | Takahashi ............. H04L 5/0053 |
| | | | 370/503 |
| 2024/0129101 | A1* | 4/2024 | Yuan ......................... H04L 5/14 |
| 2024/0155603 | A1* | 5/2024 | Li ............................. H04L 5/16 |
| 2024/0284361 | A1* | 8/2024 | Wei ....................... H04L 5/0078 |

FOREIGN PATENT DOCUMENTS

| | | |
|---|---|---|
| CN | 112400292 A | 2/2021 |
| CN | 112771810 A | 5/2021 |
| CN | 112913301 A | 6/2021 |
| CN | 112970315 A | 6/2021 |
| WO | WO-2020163368 A1 | 8/2020 |

OTHER PUBLICATIONS

R4-1902893, "Further discussion on collision of RRM measurement with UL transmission" Intel Corporation, Apr. 2019, 5 Pages.
Office Action issued under Chinese application No. 2021800072544, issued Feb. 10, 2026, 30 Pages with English Translation.

* cited by examiner

200A

200B

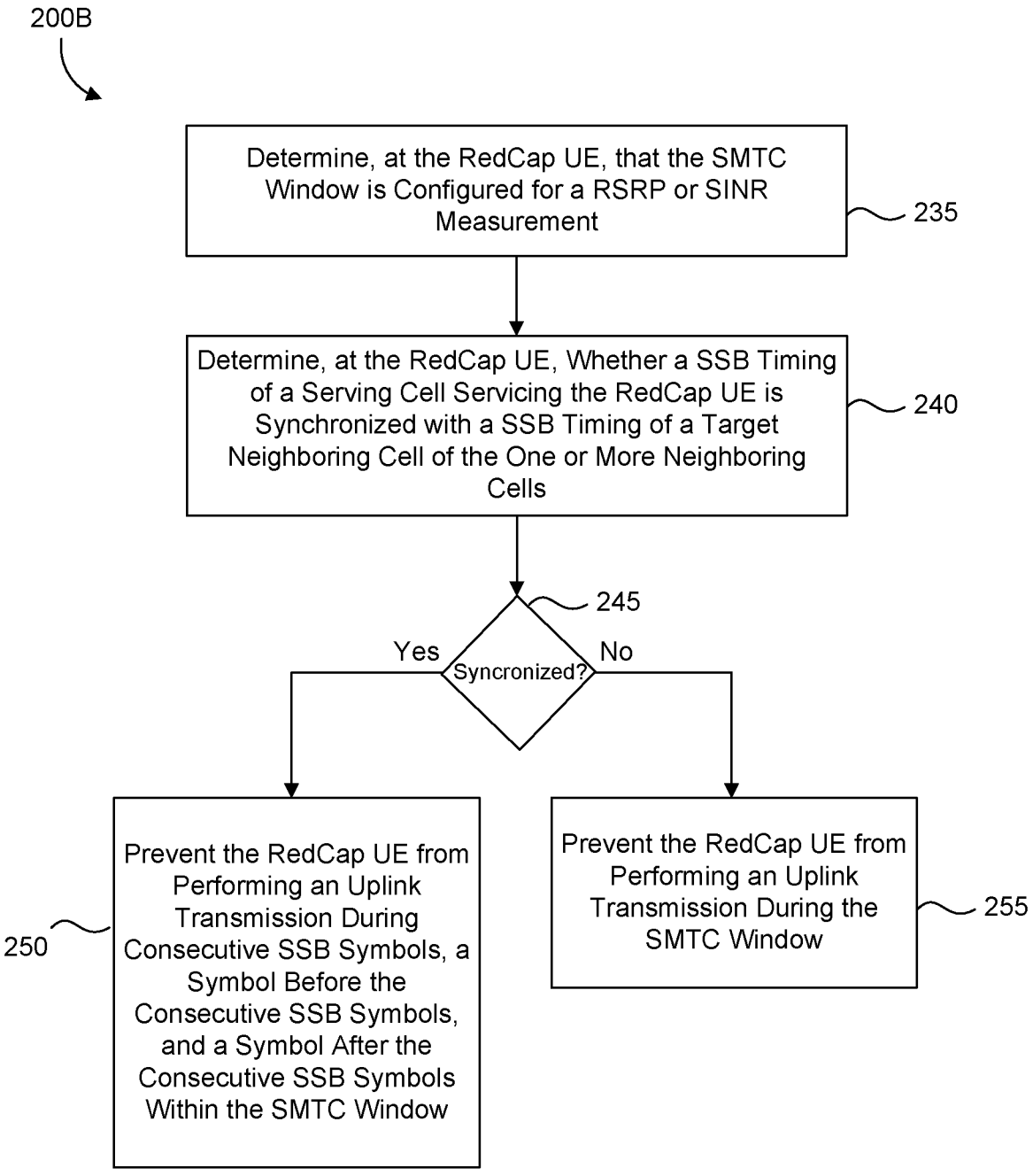

Determine, at the RedCap UE, that the SMTC Window is Configured for a RSRP or SINR Measurement — 235

Determine, at the RedCap UE, Whether a SSB Timing of a Serving Cell Servicing the RedCap UE is Synchronized with a SSB Timing of a Target Neighboring Cell of the One or More Neighboring Cells — 240

245

Yes    No

Syncronized?

Prevent the RedCap UE from Performing an Uplink Transmission During Consecutive SSB Symbols, a Symbol Before the Consecutive SSB Symbols, and a Symbol After the Consecutive SSB Symbols Within the SMTC Window — 250

Prevent the RedCap UE from Performing an Uplink Transmission During the SMTC Window — 255

Figure 2B

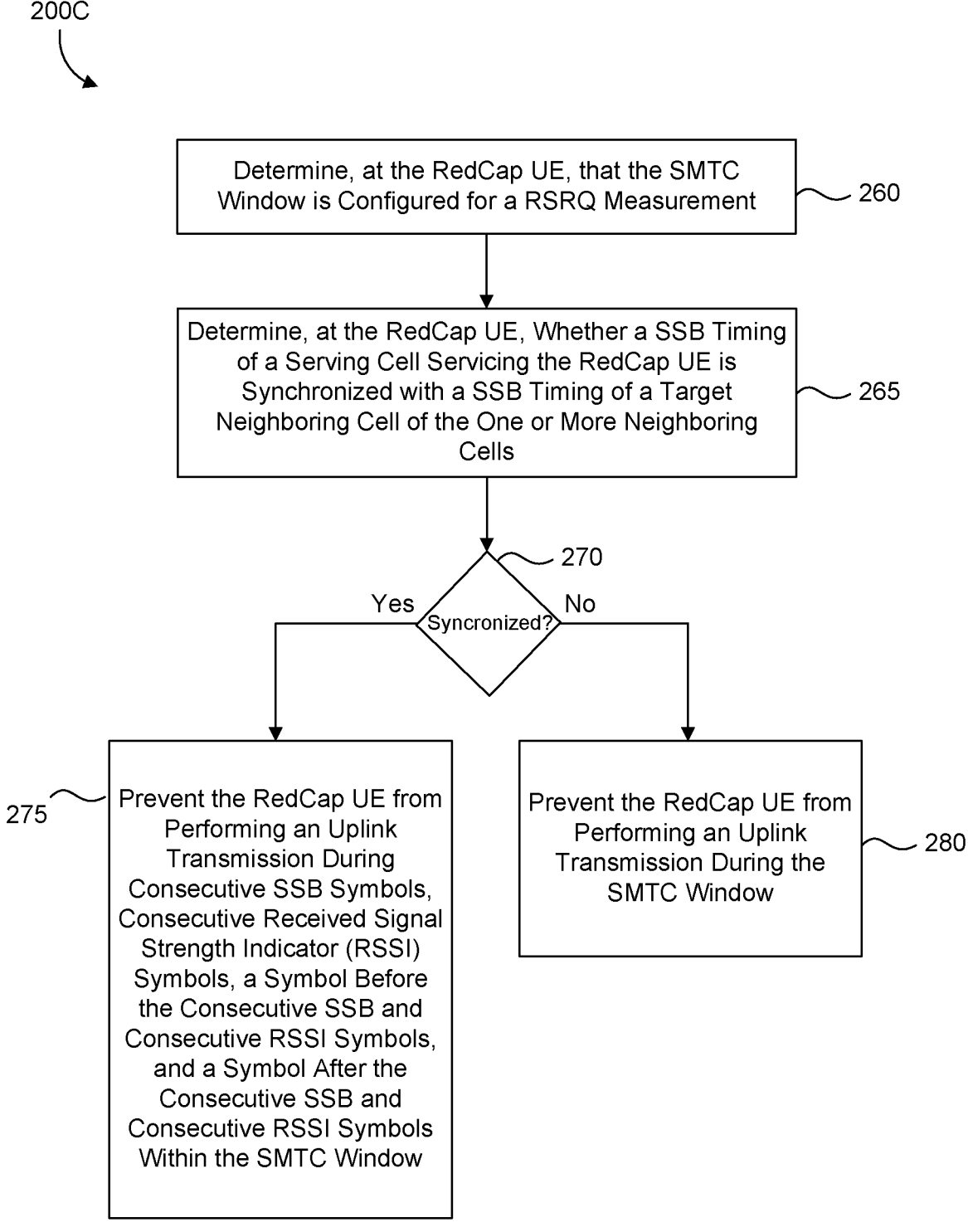

200C

Determine, at the RedCap UE, that the SMTC Window is Configured for a RSRQ Measurement — 260

Determine, at the RedCap UE, Whether a SSB Timing of a Serving Cell Servicing the RedCap UE is Synchronized with a SSB Timing of a Target Neighboring Cell of the One or More Neighboring Cells — 265

270

Yes     No

Syncronized?

275 — Prevent the RedCap UE from Performing an Uplink Transmission During Consecutive SSB Symbols, Consecutive Received Signal Strength Indicator (RSSI) Symbols, a Symbol Before the Consecutive SSB and Consecutive RSSI Symbols, and a Symbol After the Consecutive SSB and Consecutive RSSI Symbols Within the SMTC Window Prevent the RedCap UE from Performing an Uplink Transmission During the SMTC Window — 280

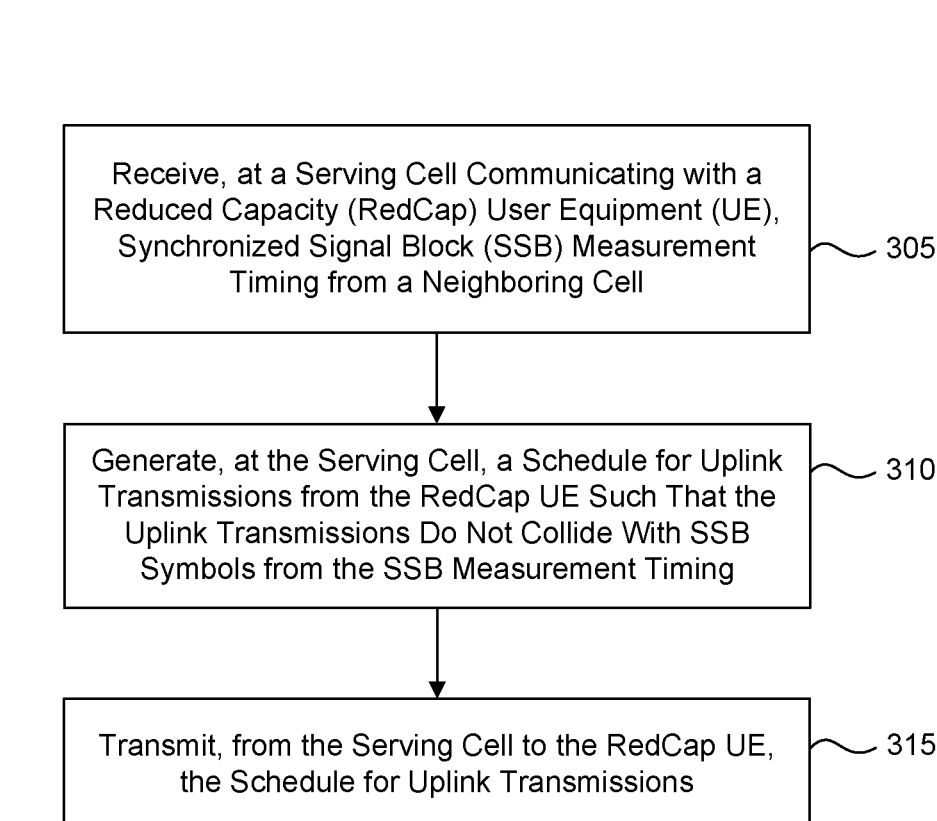

Receive, at a Serving Cell Communicating with a Reduced Capacity (RedCap) User Equipment (UE), Synchronized Signal Block (SSB) Measurement Timing from a Neighboring Cell — 305

Generate, at the Serving Cell, a Schedule for Uplink Transmissions from the RedCap UE Such That the Uplink Transmissions Do Not Collide With SSB Symbols from the SSB Measurement Timing — 310

Transmit, from the Serving Cell to the RedCap UE, the Schedule for Uplink Transmissions — 315

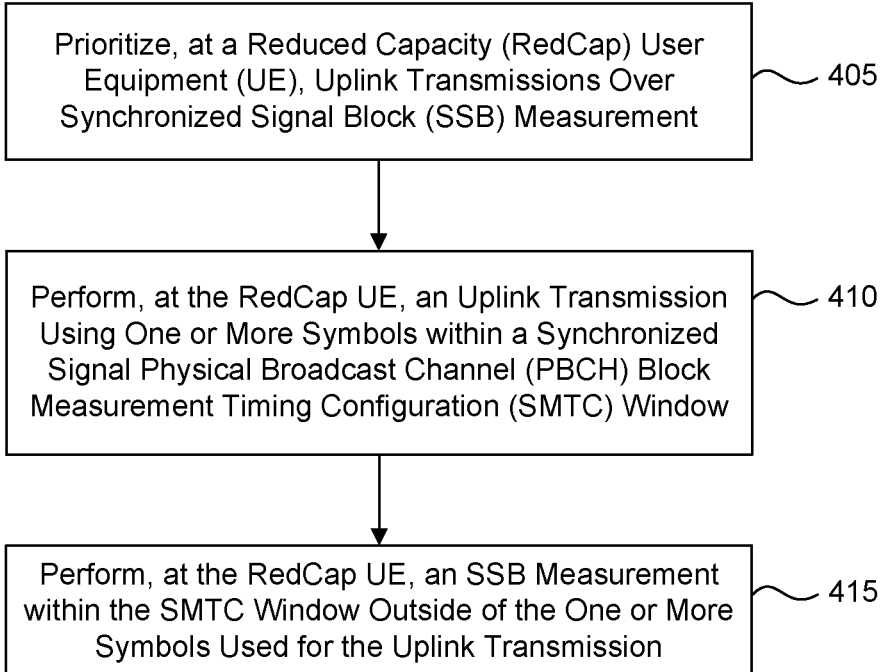

| Prioritize, at a Reduced Capacity (RedCap) User Equipment (UE), Uplink Transmissions Over Synchronized Signal Block (SSB) Measurement | 405 |

| Perform, at the RedCap UE, an Uplink Transmission Using One or More Symbols within a Synchronized Signal Physical Broadcast Channel (PBCH) Block Measurement Timing Configuration (SMTC) Window | 410 |

| Perform, at the RedCap UE, an SSB Measurement within the SMTC Window Outside of the One or More Symbols Used for the Uplink Transmission | 415 |

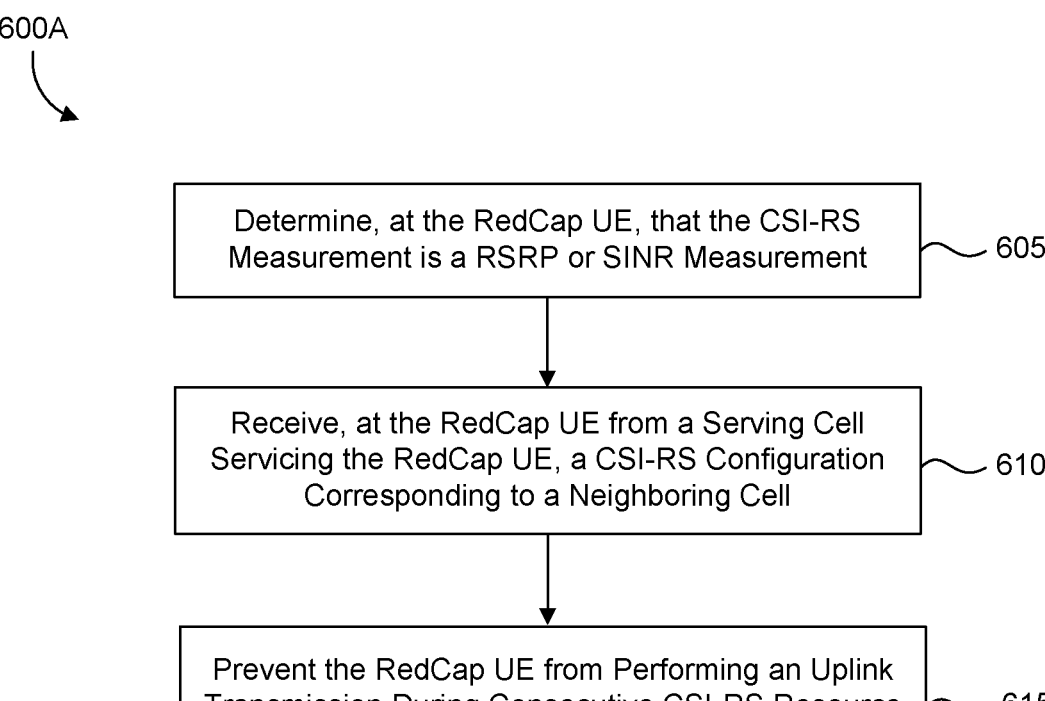

Determine, at the RedCap UE, that the CSI-RS Measurement is a RSRP or SINR Measurement ~ 605

Receive, at the RedCap UE from a Serving Cell Servicing the RedCap UE, a CSI-RS Configuration Corresponding to a Neighboring Cell ~ 610

Prevent the RedCap UE from Performing an Uplink Transmission During Consecutive CSI-RS Resource Symbols of the CSI-RS Configuration, a Symbol Before the Consecutive CSI-RS Resource Symbols, and a Symbol After the Consecutive CSI-RS Resource Symbols ~ 615

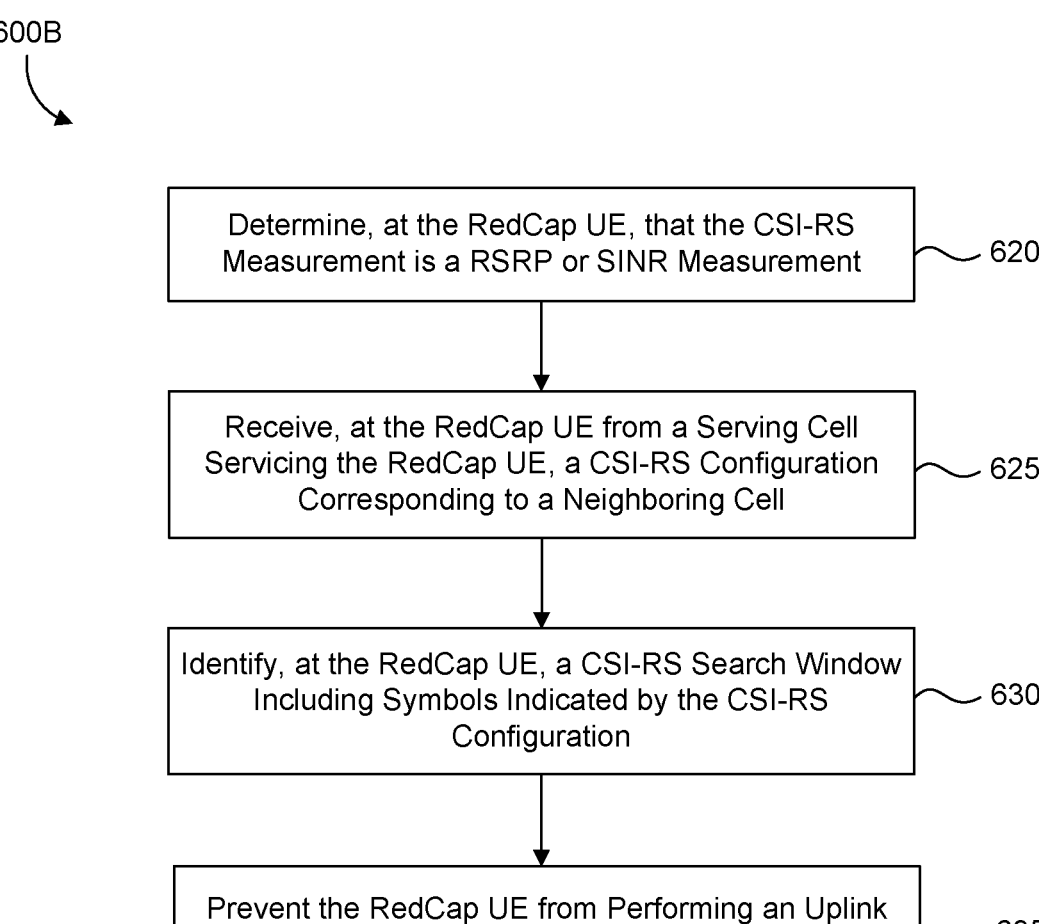

Determine, at the RedCap UE, that the CSI-RS Measurement is a RSRP or SINR Measurement ⟩— 620

Receive, at the RedCap UE from a Serving Cell Servicing the RedCap UE, a CSI-RS Configuration Corresponding to a Neighboring Cell ⟩— 625

Identify, at the RedCap UE, a CSI-RS Search Window Including Symbols Indicated by the CSI-RS Configuration ⟩— 630

Prevent the RedCap UE from Performing an Uplink Transmission During the CSI-RS Search Window ⟩— 635

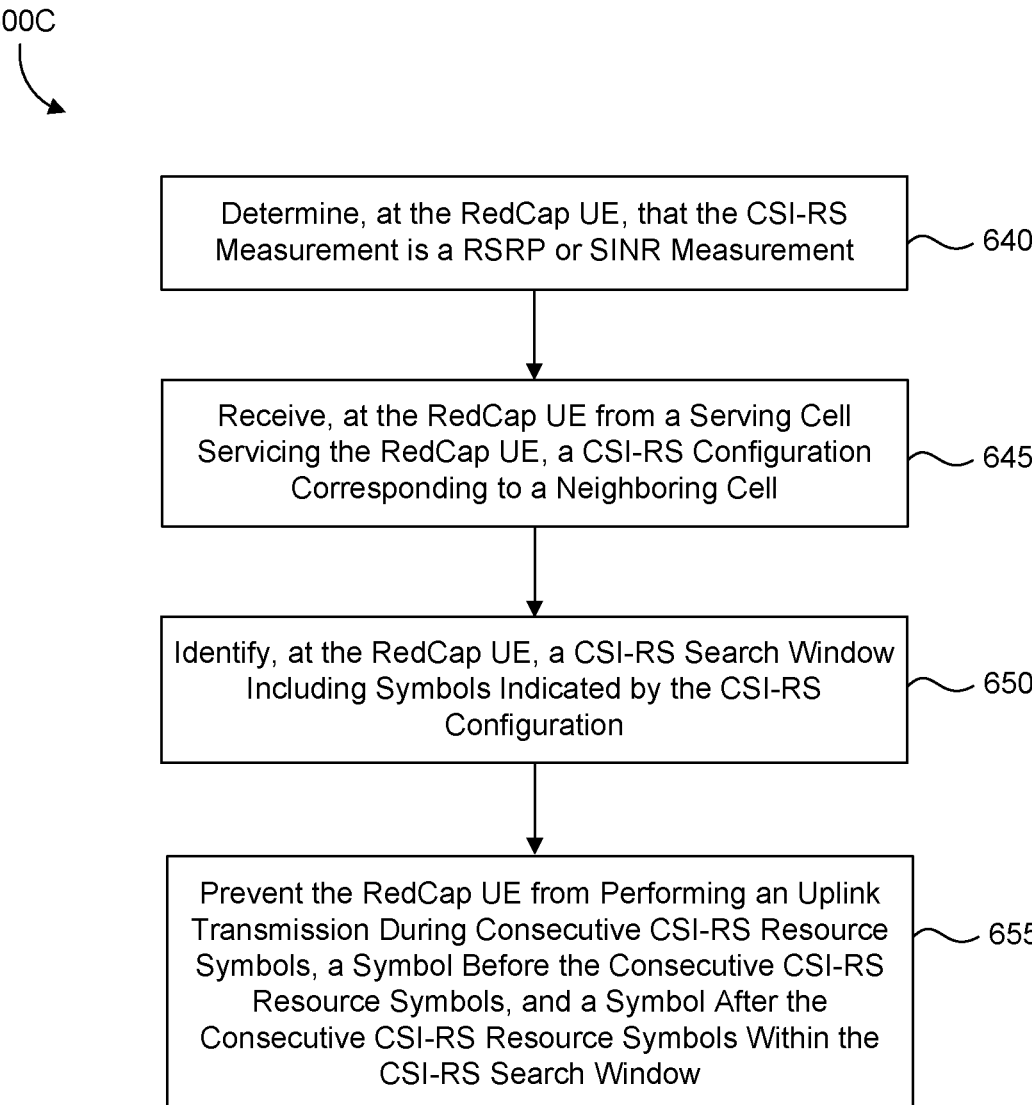

Determine, at the RedCap UE, that the CSI-RS Measurement is a RSRP or SINR Measurement — 640

Receive, at the RedCap UE from a Serving Cell Servicing the RedCap UE, a CSI-RS Configuration Corresponding to a Neighboring Cell — 645

Identify, at the RedCap UE, a CSI-RS Search Window Including Symbols Indicated by the CSI-RS Configuration — 650

Prevent the RedCap UE from Performing an Uplink Transmission During Consecutive CSI-RS Resource Symbols, a Symbol Before the Consecutive CSI-RS Resource Symbols, and a Symbol After the Consecutive CSI-RS Resource Symbols Within the CSI-RS Search Window — 655

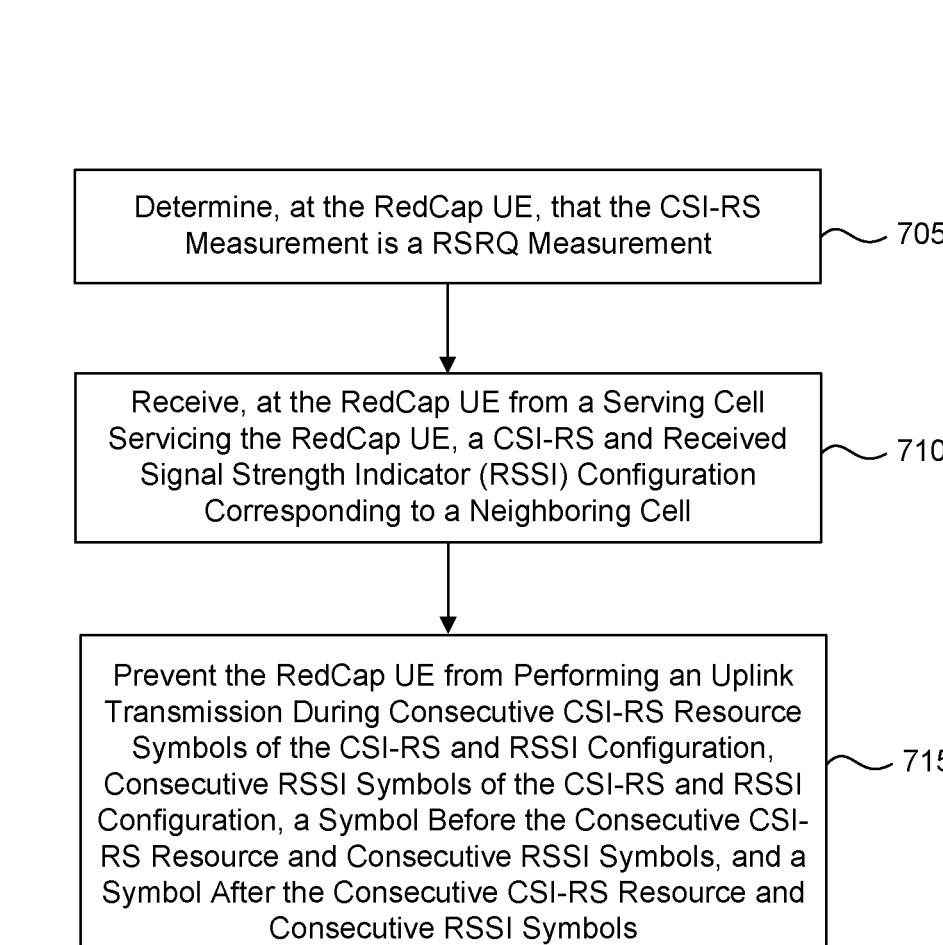

Determine, at the RedCap UE, that the CSI-RS Measurement is a RSRQ Measurement ⌇~ 705

Receive, at the RedCap UE from a Serving Cell Servicing the RedCap UE, a CSI-RS and Received Signal Strength Indicator (RSSI) Configuration Corresponding to a Neighboring Cell ⌇~ 710

Prevent the RedCap UE from Performing an Uplink Transmission During Consecutive CSI-RS Resource Symbols of the CSI-RS and RSSI Configuration, Consecutive RSSI Symbols of the CSI-RS and RSSI Configuration, a Symbol Before the Consecutive CSI-RS Resource and Consecutive RSSI Symbols, and a Symbol After the Consecutive CSI-RS Resource and Consecutive RSSI Symbols ⌇~ 715

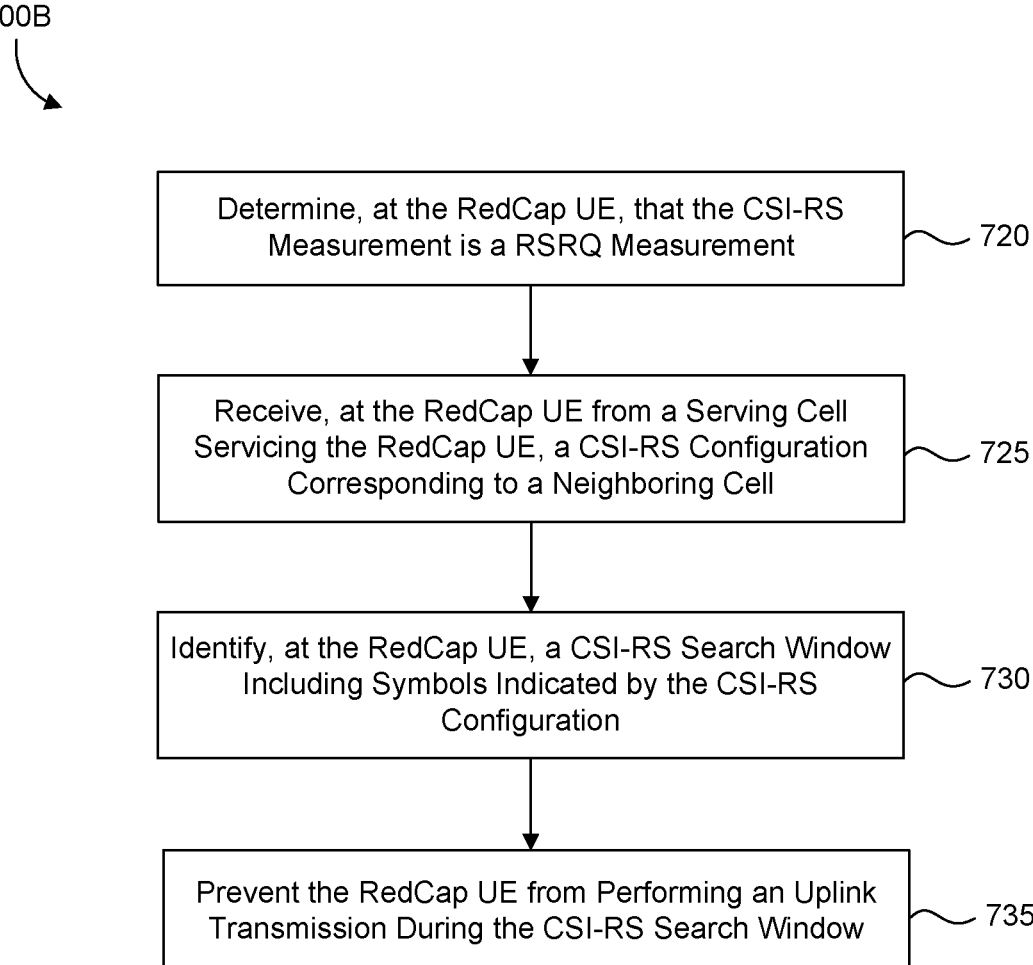

Determine, at the RedCap UE, that the CSI-RS Measurement is a RSRQ Measurement — 720

Receive, at the RedCap UE from a Serving Cell Servicing the RedCap UE, a CSI-RS Configuration Corresponding to a Neighboring Cell — 725

Identify, at the RedCap UE, a CSI-RS Search Window Including Symbols Indicated by the CSI-RS Configuration — 730

Prevent the RedCap UE from Performing an Uplink Transmission During the CSI-RS Search Window — 735

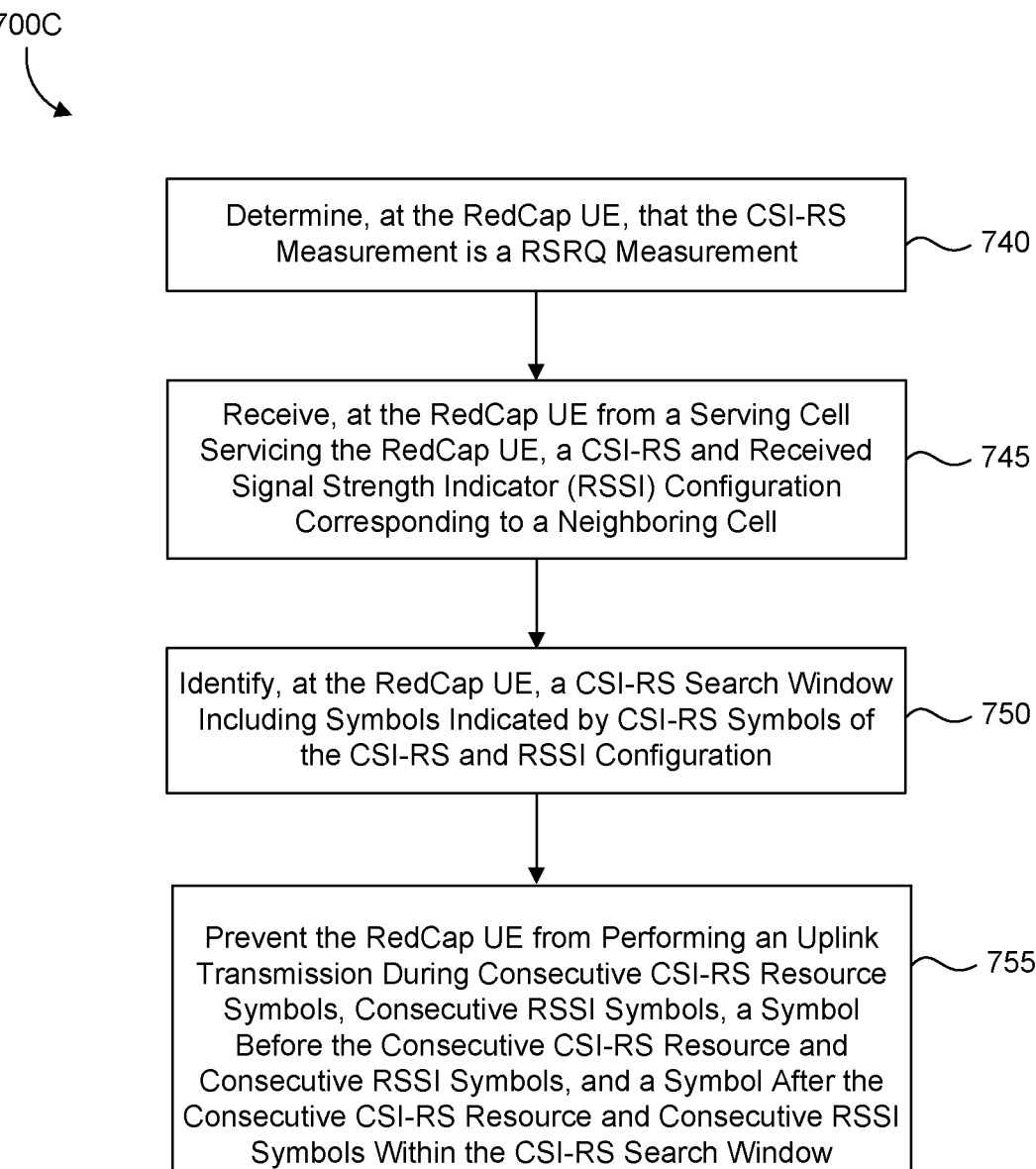

Determine, at the RedCap UE, that the CSI-RS Measurement is a RSRQ Measurement 740

Receive, at the RedCap UE from a Serving Cell Servicing the RedCap UE, a CSI-RS and Received Signal Strength Indicator (RSSI) Configuration Corresponding to a Neighboring Cell 745

Identify, at the RedCap UE, a CSI-RS Search Window Including Symbols Indicated by CSI-RS Symbols of the CSI-RS and RSSI Configuration 750

Prevent the RedCap UE from Performing an Uplink Transmission During Consecutive CSI-RS Resource Symbols, Consecutive RSSI Symbols, a Symbol Before the Consecutive CSI-RS Resource and Consecutive RSSI Symbols, and a Symbol After the Consecutive CSI-RS Resource and Consecutive RSSI Symbols Within the CSI-RS Search Window 755

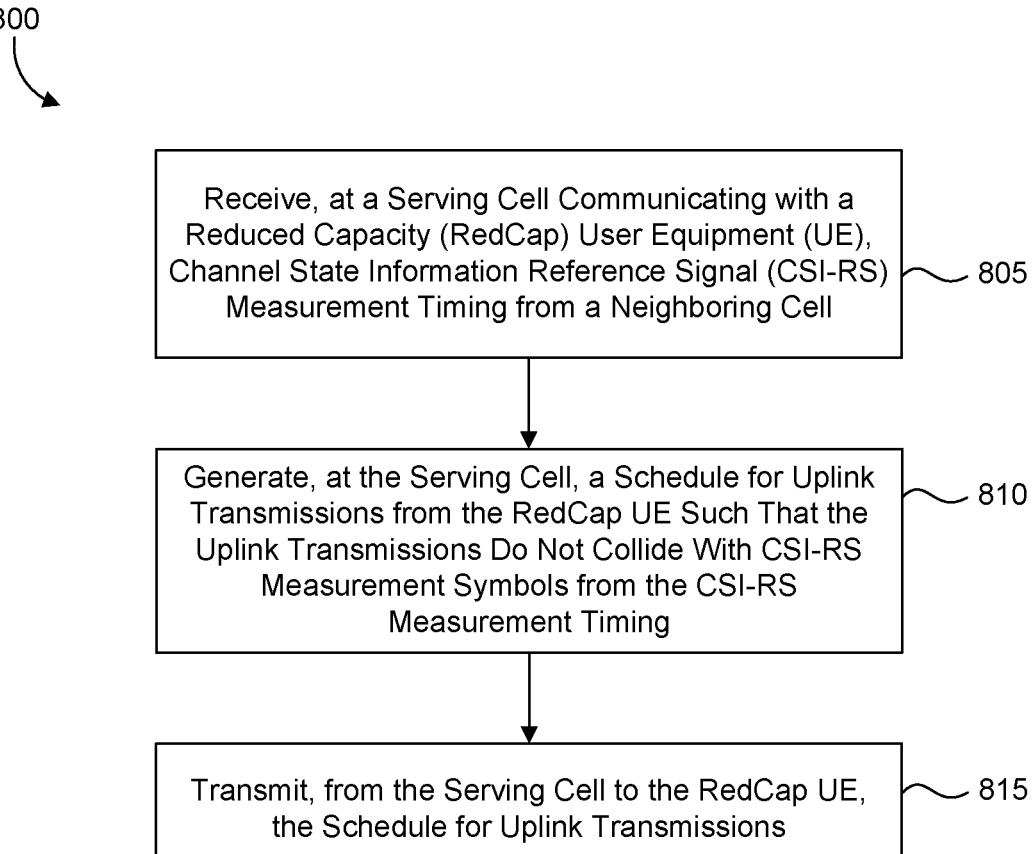

Receive, at a Serving Cell Communicating with a Reduced Capacity (RedCap) User Equipment (UE), Channel State Information Reference Signal (CSI-RS) Measurement Timing from a Neighboring Cell ⌐ 805

Generate, at the Serving Cell, a Schedule for Uplink Transmissions from the RedCap UE Such That the Uplink Transmissions Do Not Collide With CSI-RS Measurement Symbols from the CSI-RS Measurement Timing ⌐ 810

Transmit, from the Serving Cell to the RedCap UE, the Schedule for Uplink Transmissions ⌐ 815

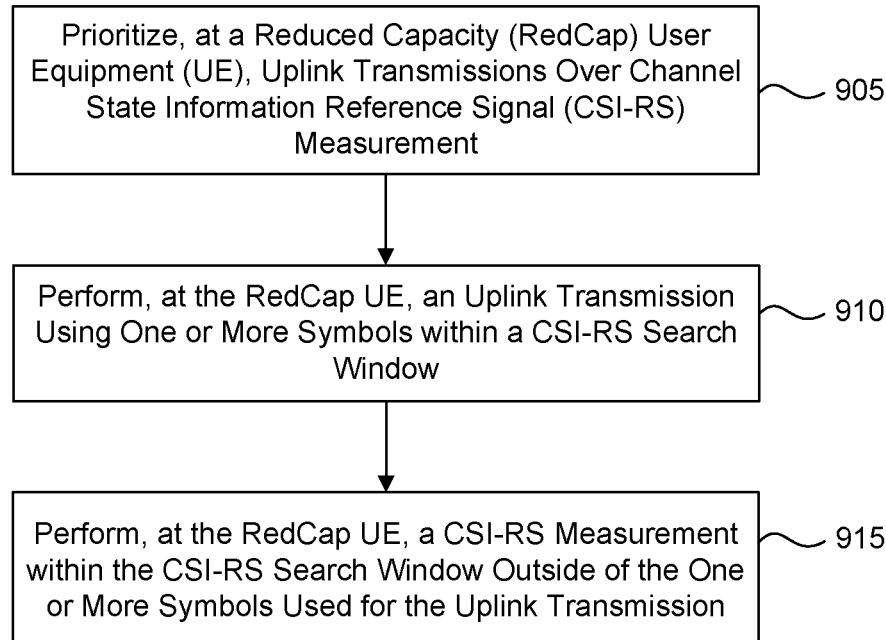

Prioritize, at a Reduced Capacity (RedCap) User Equipment (UE), Uplink Transmissions Over Channel State Information Reference Signal (CSI-RS) Measurement — 905

Perform, at the RedCap UE, an Uplink Transmission Using One or More Symbols within a CSI-RS Search Window — 910

Perform, at the RedCap UE, a CSI-RS Measurement within the CSI-RS Search Window Outside of the One or More Symbols Used for the Uplink Transmission — 915

Figure 9

RADIO RESOURCE MANAGEMENT MEASUREMENT PRIORITIZATION FOR REDUCED CAPACITY USER EQUIPMENT

CROSS REFERENCE TO RELATED PATENT APPLICATIONS

This application is a U.S. National Phase of International Application No. PCT/CN2021/110573, filed Aug. 4, 2021, which is hereby incorporated by reference in its entirety.

BACKGROUND

Field

Various aspects generally may relate to the field of wireless communications.

SUMMARY

Some aspects of this disclosure include apparatuses and methods for radio resource management prioritization for reduced capacity user equipment (RedCap UE).

In some aspects, a method for prioritizing synchronized signal block (SSB) measurement at a RedCap UE may include determining, at the RedCap UE, that a synchronized signal physical broadcast channel block measurement timing configuration (SMTC) window includes a synchronized signal block (SSB) measurement for one or more neighboring cells. The method may include determining, at the RedCap UE, that a measurement gap is not applied to the SSB measurement for the one or more neighboring cells. The method may include prioritizing, at the RedCap, the SSB measurement for the one or more neighboring cells in the SMTC window over an uplink transmission from the RedCap UE.

In some aspects, when the RedCap UE prioritizes the SSB measurement, the method may further include determining, at the RedCap UE, that the SMTC window is configured for a Reference Signal Received Power (RSRP) or Signal to Interference and Noise Ratio (SINR) measurement. The method may further include determining that SSB timing of a serving cell servicing the RedCap UE is synchronized with a SSB timing of a target neighboring cell of the one or more neighboring cells and preventing the RedCap UE from performing an uplink transmission during consecutive SSB symbols, a symbol before the consecutive SSB symbols, and a symbol after the consecutive SSB symbols within the SMTC window.

In some aspects, to determine that the SSB timing of the serving cell is synchronized with the SSB timing of the target neighboring cell, the method may further include checking an SSB index flag and determining that the SSB index flag is enabled.

In some aspects, when the RedCap UE prioritizes the SSB measurement, the method may further include determining, at the RedCap UE, that the SMTC window is configured for a RSRP or SINR measurement. The method may further include determining that SSB timing of a serving cell servicing the RedCap UE is not synchronized with a SSB timing of a target neighboring cell of the one or more neighboring cells. The method may further include preventing the RedCap UE from performing an uplink transmission during the SMTC window.

In some aspects, to determine that the SSB timing of the serving cell is not synchronized with the SSB timing of the target neighboring cell, the method may further include checking an SSB index flag and determining that the SSB index flag is not enabled.

In some aspects, when the RedCap UE prioritizes the SSB measurement, the method may further include determining, at the RedCap UE, that the SMTC window is configured for a Reference Signal Received Quality (RSRQ) measurement. The method may further include determining that SSB timing of a serving cell servicing the RedCap UE is synchronized with a SSB timing of a target neighboring cell of the one or more neighboring cells. The method may further include preventing the RedCap UE from performing an uplink transmission during consecutive SSB symbols, consecutive Received Signal Strength Indicator (RSSI) symbols, a symbol before the consecutive SSB and consecutive RSSI symbols, and a symbol after the consecutive SSB and consecutive RSSI symbols within the SMTC window.

In some aspects, when the RedCap UE prioritizes the SSB measurement, the method may further include determining, at the RedCap UE, that the SMTC window is configured for a RSRQ measurement. The method may further include determining that SSB timing of a serving cell servicing the RedCap UE is not synchronized with a SSB timing of a target neighboring cell of the one or more neighboring cells. The method may further include preventing the RedCap UE from performing an uplink transmission during the SMTC window.

In some aspects, the RedCap UE communicates with a base station using half-duplex frequency division duplex (HD-FDD) communications.

In some aspects, the uplink transmission is a Physical Uplink Control Channel (PUCCH), a Physical Uplink Shared Channel (PUSCH), a Sounding Reference Signal (SRS), or a Random Access Channel (RACH) transmission.

In some aspects, a method for prioritizing a Channel State Information Reference Signal (CSI-RS) measurement at a RedCap UE may include receiving, at the RedCap UE and from a serving cell, an indication of a CSI-RS measurement at a neighboring cell. The method may further include determining, at the RedCap UE, that a measurement gap is not applied to the CSI-RS measurement. The method may further include prioritizing, at the RedCap, the CSI-RS measurement over an uplink transmission from the RedCap UE.

In some aspects, when the RedCap UE prioritizes the CSI-RS measurement, the method may further include determining, at the RedCap UE, that the CSI-RS measurement is a RSRP or SINR measurement. The method may further include receiving, at the RedCap UE, from the serving cell, a CSI-RS configuration corresponding to the neighboring cell. The method may further include preventing the RedCap UE from performing an uplink transmission during consecutive CSI-RS resource symbols of the CSI-RS configuration, a symbol before the consecutive CSI-RS resource symbols, and a symbol after the consecutive CSI-RS resource symbols.

In some aspects, when the RedCap UE prioritizes the CSI-RS measurement, the method may further include determining, at the RedCap UE, that the CSI-RS measurement is a RSRP or SINR measurement. The method may further include receiving, at the RedCap UE, from the serving cell, a CSI-RS configuration corresponding to the neighboring cell and identifying, at the RedCap UE, a CSI-RS search window including symbols indicated by the CSI-RS configuration. The method may further include preventing the RedCap UE from performing an uplink transmission during the CSI-RS search window.

In some aspects, when the RedCap UE prioritizes the CSI-RS measurement, the method may further include determining, at the RedCap UE, that the CSI-RS measurement is a RSRP or SINR measurement. The method may further include receiving, at the RedCap UE, from the serving cell, a CSI-RS configuration corresponding to the neighboring cell and identifying, at the RedCap UE, a CSI-RS search window including symbols indicated by the CSI-RS configuration. The method may further include preventing the RedCap UE from performing an uplink transmission during consecutive CSI-RS resource symbols, a symbol before the consecutive CSI-RS resource symbols, and a symbol after the consecutive CSI-RS resource symbols within the CSI-RS search window.

In some aspects, when the RedCap UE prioritizes the CSI-RS measurement, the method may further include determining, at the RedCap UE, that the CSI-RS measurement is a RSRQ measurement. The method may further include receiving, at the RedCap UE, from the serving cell, a CSI-RS and RSSI configuration corresponding to the neighboring cell. The method may further include preventing the RedCap UE from performing an uplink transmission during consecutive CSI-RS resource symbols of the CSI-RS and RSSI configuration, consecutive RSSI symbols of the CSI-RS and RSSI configuration, a symbol before the consecutive CSI-RS resource and consecutive RSSI symbols, and a symbol after the consecutive CSI-RS and consecutive RSSI symbols.

In some aspects, when the RedCap UE prioritizes the CSI-RS measurement, the method may further include determining, at the RedCap UE, that the CSI-RS measurement is a RSRQ measurement. The method may further include receiving, at the RedCap UE, from the serving cell, a CSI-RS configuration corresponding to the neighboring cell. The method may further include identifying, at the RedCap UE, a CSI-RS search window including symbols indicated by the CSI-RS configuration and preventing the RedCap UE from performing an uplink transmission during the CSI-RS search window.

In some aspects, when the RedCap UE prioritizes the CSI-RS measurement, the method may further include determining, at the RedCap UE, that the CSI-RS measurement is a RSRQ measurement. The method may further include receiving, at the RedCap UE, from the serving cell, a CSI-RS and RSSI configuration corresponding to the neighboring cell. The method may further include identifying, at the RedCap UE, a CSI-RS search window including symbols indicated by the CSI-RS and RSSI configuration. The method may further include preventing the RedCap UE from performing an uplink transmission during consecutive CSI-RS resource symbols, consecutive RSSI symbols, a symbol before the consecutive CSI-RS resource and consecutive RSSI symbols, and a symbol after the consecutive CSI-RS and consecutive RSSI symbols within the CSI-RS search window.

In some aspects, a RedCap UE may comprise a transceiver and at least one processor coupled to the transceiver, wherein the at least one processor is configured to determine whether a synchronized signal block (SSB) measurement or a Channel State Information Reference Signal (CSI-RS) measurement has been configured. The at least one processor may determine that a measurement gap is not applied to the SSB measurement or the CSI-RS measurement. The at least one processor may prioritize the SSB measurement in a SMTC window over an uplink transmission from the RedCap UE and prioritize the CSI-RS measurement over the uplink transmission from the RedCap UE.

In some aspects, to prioritize the SSB measurement, the at least one processor is further configured to determine that the SMTC window is configured for a Reference Signal Received Power (RSRP) or Signal to Interference and Noise Ratio (SINR) measurement and determine whether SSB timing of a serving cell servicing the RedCap UE is synchronized with a SSB timing of a target neighboring cell. When the SSB timing of the serving cell is synchronized with the SSB timing of the neighboring cell, the at least one processor is further configured to prevent the RedCap UE from performing an uplink transmission during consecutive SSB symbols, a symbol before the consecutive SSB symbols, and a symbol after the consecutive SSB symbols within the SMTC window. When the SSB timing of the serving cell is not synchronized with the SSB timing of the target neighboring cell, the at least one processor is further configured to prevent the RedCap UE from performing an uplink transmission during the SMTC window In some aspects, to prioritize the SSB measurement, the at least one processor is further configured to determine that the SMTC window is configured for a RSRQ measurement and determine whether SSB timing of a serving cell servicing the RedCap UE is synchronized with a SSB timing of a target neighboring cell. When the SSB timing of the serving cell is synchronized with the SSB timing of the target neighboring cell, the at least one processor is further configured to prevent the RedCap UE from performing an uplink transmission during consecutive SSB symbols, consecutive Received Signal Strength Indicator (RSSI) symbols, a symbol before the consecutive SSB and consecutive RSSI symbols, and a symbol after the consecutive SSB and consecutive RSSI symbols within the SMTC window. When the SSB timing of the serving cell is not synchronized with the SSB timing of the target neighboring cell, the at least one processor is further configured to prevent the RedCap UE from performing an uplink transmission during the SMTC window.

In some aspects, to prioritize the CSI-RS measurement, the at least one processor is further configured to determine that the CSI-RS measurement is a Reference Signal Received Power (RSRP) or Signal to Interference and Noise Ratio (SINR) measurement. The at least one processor is further configured to receive, from a serving cell, a CSI-RS configuration corresponding to a target neighboring cell and prevent the RedCap UE from performing an uplink transmission during consecutive CSI-RS resource symbols of the CSI-RS configuration, a symbol before the consecutive CSI-RS resource symbols, and a symbol after the consecutive CSI-RS resource symbols.

In some aspects, a method for prioritizing a measurement gap at a RedCap UE may include determining, at the RedCap UE, whether a SSB measurement or a CSI-RS measurement has been configured. The method may further include determining, at the RedCap UE, that a measurement gap is applied to the SSB measurement or the CSI-RS measurement and prioritizing, at the RedCap, the measurement gap over an uplink transmission from the RedCap UE based on the RedCap UE using half-duplex frequency division duplex (HD-FDD) communications.

BRIEF DESCRIPTION OF THE DRAWINGS/FIGURES

FIG. TA illustrates an example system implementing reduced capacity (RedCap) user equipment (UE) measurement prioritization, according to some aspects.

FIG. 2B illustrates a flowchart for Reference Signal Received Power (RSRP) or Signal to Interference and Noise Ratio (SINR) measurement prioritization based on SSB symbols at a RedCap UE, according to some aspects.

FIG. 2C illustrates a flowchart for Reference Signal Received Quality (RSRQ) measurement prioritization based on SSB symbols at a RedCap UE, according to some aspects.

FIG. 3 illustrates a flowchart for network scheduling of SSB measurement symbols, according to some aspects.

FIG. 4 illustrates a flowchart for prioritizing uplink transmission at a RedCap UE over SSB measurement symbols, according to some aspects.

FIG. 6A illustrates a flowchart for RSRP or SINR measurement prioritization based on CSI-RS resource symbols at a RedCap UE, according to some aspects.

FIG. 6B illustrates a flowchart for RSRP or SINR measurement prioritization based on a CSI-RS search window at a RedCap UE, according to some aspects.

FIG. 6C illustrates a flowchart for RSRP or SINR measurement prioritization based on CSI-RS resource symbols within a CSI-RS search window at a RedCap UE, according to some aspects.

FIG. 7A illustrates a flowchart for RSRQ measurement prioritization based on CSI-RS resource symbols at a RedCap UE, according to some aspects.

FIG. 7B illustrates a flowchart for RSRQ measurement prioritization based on a CSI-RS search window at a RedCap UE, according to some aspects.

FIG. 7C illustrates a flowchart for RSRQ measurement prioritization based on CSI-RS resource symbols within a CSI-RS search window at a RedCap UE, according to some aspects.

FIG. 8 illustrates a flowchart for network scheduling of CSI-RS measurement symbols, according to some aspects.

FIG. 9 illustrates a flowchart for prioritizing uplink transmission at a RedCap UE over CSI-RS measurement symbols, according to some aspects.

Figure 1A:
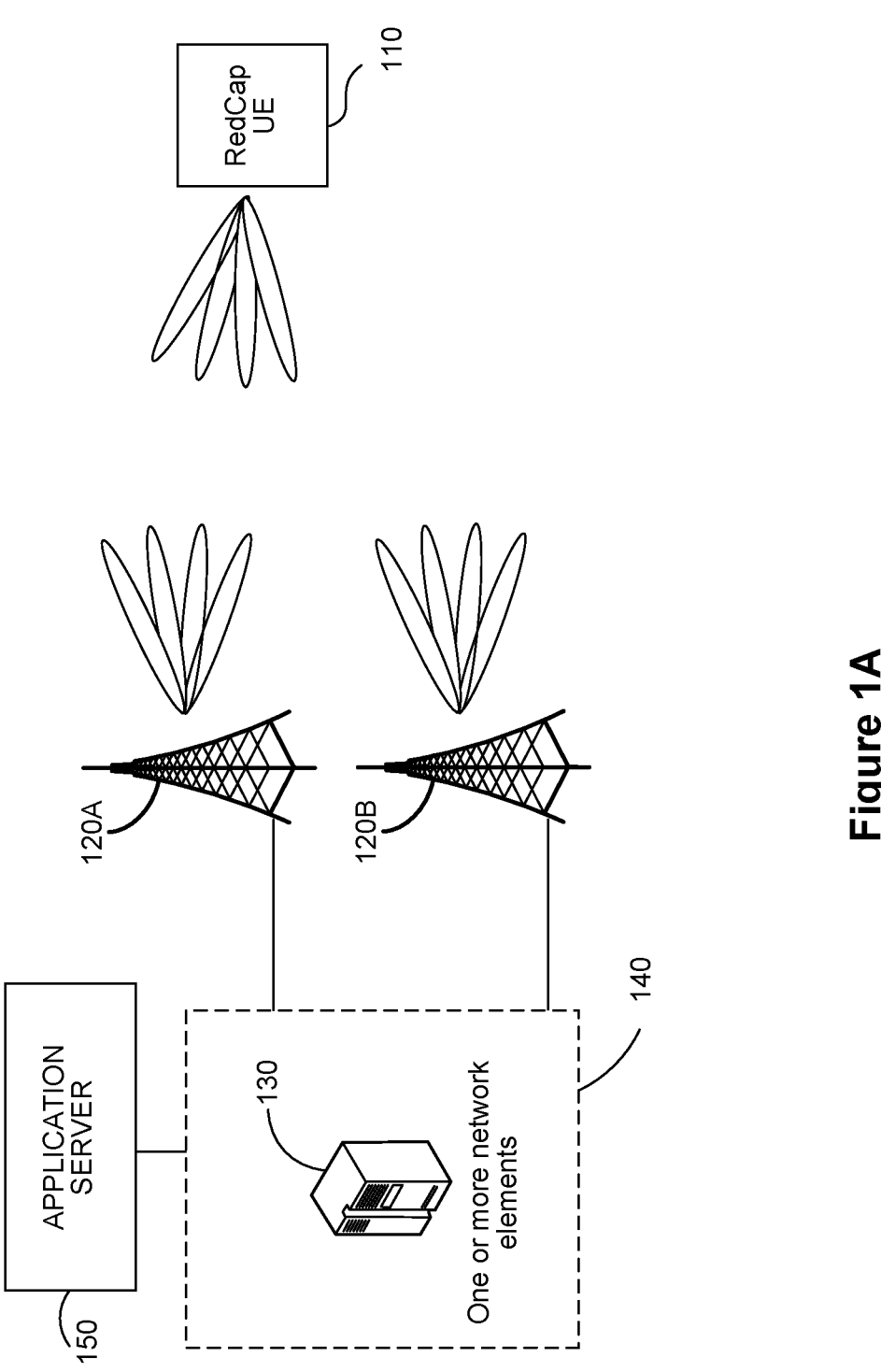
FIG. 1B illustrates a block diagram of an example wireless system of an electronic device implementing measurement prioritization, according to some aspects.

The features and advantages of the aspects will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

This disclosure relates to reduced capacity (RedCap) user equipment (UE) communications using the various wireless communications protocols, including those developed by the 3rd Generation Partnership Project (3GPP), including Release 15 (Rel-15), Release 16 (Rel-16), Release 17 (Rel-17), or others, of which one or more are related to the 5G wireless protocol standard (e.g., 5G).

As developments continue with subsequent releases of the 5G standard and beyond, one consideration that remains is how to configure a RedCap UE for communications. A RedCap UE may be a smart device, a wearable device, smart watch, wearable medical device, an AV or VR goggle, an internet-of-things (IoT) device, a sensor, a video surveillance device, and/or other UE with reduced capabilities. Some RedCap UEs may have limited communication capabilities based on their design. For example, some RedCap UEs may use limited communication capabilities to extend battery life. Some RedCap UEs may use half-duplex frequency division duplex (HD-FDD) for communication. In view of potential communication limitations, the RedCap UE may face difficulties communicating with wireless networks.

One such difficulty arises when a RedCap UE is in the proximity of a serving cell and a neighboring cell. Due to the reduced communication capabilities of the RedCap UE, the RedCap UE may face issues with scheduling uplink transmissions with a base station corresponding to the serving cell. For example, timing and/or frequency usage between the serving cell and the neighboring cell may not be synchronized. In this case, the RedCap UE may not have information for scheduling uplink transmission to the serving cell base station. Without this uplink transmission scheduling, the RedCap UE may encounter and/or cause interference with other UEs and/or RedCap UEs communicating with the neighboring cell.

For example, a first RedCap UE may perform an uplink transmission when another second RedCap UE is attempting to measure a reference signal to determine signal quality. In this case, the transmission from the first RedCap UE may interfere with the measurement being performed by the second RedCap UE. Similarly, the second RedCap UE may be performing the desired measurement without being aware of the uplink transmission from the first RedCap UE. This collision in signals may cause an erroneous measurement at the second RedCap UE. Similarly, the first RedCap UE may be instructed to perform a measurement. The first RedCap UE may prioritize measurements to avoid interference with its own uplink transmissions.

To resolve these issues, this disclosure describes aspects for providing radio resource management prioritization for RedCap UE. The RedCap UE may define a schedule for uplink transmissions while accounting for reference signal measurements. For example, the schedule may consider timing and/or scheduling for synchronization signal block (SSB) and/or channel state information reference signal (CSI-RS) related measurements. SSB and/or CSI-RS related measurement symbols may be used to determine Reference Signal Received Power (RSRP), Signal to Interference and Noise Ratio (SINR), and/or Reference Signal Received Quality (RSRQ) measurements. In some aspects, Received Signal Strength Indicator (RSSI) signals may also be considered by the RedCap UE's scheduling. These measurements may be used to tracked signal quality and/or mobility of the RedCap UE.

By applying a prioritization to SSB and/or CSI-RS related measurement symbols, RedCap UE may avoid potential collisions with uplink transmissions. Configuring a RedCap UE with these prioritizations may allow for scheduling of uplink transmission even when the RedCap UE does not have information corresponding to neighboring cell's timing. For example, a RedCap's serving cell may not be synchronized with a neighboring cell. The RedCap UE, however, may still consider SSB timing within a Synchronized Signal Physical Broadcast Channel Block Measurement Timing Configuration (SMTC) window even when the RedCap UE does not have exact timing information within the window. Further, the RedCap UE may also avoid uplink transmissions during RSSI based measurements. The RedCap UE may also avoid uplink transmissions during CSI-RS L3 measurement symbols. In this manner, the RedCap UE may avoid uplink transmissions when radio resource management signals are being used to perform measurements at neighboring cells.

Various aspects of these features will now be discussed with respect to the corresponding figures.

FIG. 1A illustrates an example system 100 implementing reduced capacity (RedCap) user equipment (UE) measurement prioritization, according to some aspects. FIG. 1A illustrates an example system architecture of a wireless network, in accordance with various aspects. The following description is provided for an example system 100 that operates in conjunction with 5G or NR system standards as provided by 3GPP technical specifications. However, the example aspects are not limited in this regard and the described aspects may apply to other networks that benefit from the principles described herein, such as other 3GPP systems (e.g., Sixth Generation (6G)) systems, IEEE 802.16 protocols (e.g., WMAN, WiMAX, etc.), or the like.

As shown by FIG. 1A, the system 100 includes reduced capacity user equipment (RedCap UE) 110. RedCap UE 110 may be a reduced capacity user equipment. As previously explained, RedCap UE 110 may communicate using half-duplex frequency division duplex (HD-FDD). RedCap UE 110 may be a smart device, a wearable device, smart watch, wearable medical device, an AV or VR goggle, an internet-of-things (IoT) device, a sensor, a video surveillance device, and/or other UE with reduced capabilities.

RedCap UE 110 may be configured to connect, for example, communicatively couple, with a Radio Access Network (RAN) including a base station 120. RedCap UE 110 may communicate with a specific base station 120A to facilitate network communications and/or RAN communications. Base station 120A may be referred to as a serving base station 120 and/or may provide a serving cell for RedCap UE 110. RedCap UE 110 may also be in proximity with base station 120B. Base station 120B may be referred to as a neighboring base station 120 and/or may provide a neighboring cell. For example, RedCap UE 110 may be in proximity to detect signals transmitted to or from base station 120B. These signals may correspond to base station 120B communicating with one or more other RedCap UEs. Based on this proximity, uplink transmissions from RedCap UE 110 when communicating with serving base station 120A may interfere with measurements and/or signals in the neighboring cell. As will be further described below, RedCap UE 110 may provide scheduling for uplink transmissions to avoid collisions with signals occurring at the neighboring cell and/or neighboring base station 120B.

Base stations 120 may be RAN nodes. Base stations 120 may also be referred to as RAN nodes or 5G Node B (gNB). In aspects, the RAN may be an NG RAN or a 5G RAN, an E-UTRAN, or a legacy RAN, such as a UTRAN or GERAN. As used herein, the terms "NR RAN" or "NG RAN" or "next-generation RAN" or the like may refer to a RAN that operates in an NR or 5G system 100, and the term "E-UTRAN" or the like may refer to a RAN that operates in an LTE or 4G system 100. The RedCap UE 110 may utilize connections (or channels), each of which comprises a physical communications interface or layer (discussed in further detail below). In some aspects, RedCap UE 110 may communicate with one or more base stations 120.

Base stations 120 are shown to be communicatively coupled to a core network—in this aspect, core network (CN) 140. The CN 140 may comprise a plurality of network elements 130, which are configured to offer various data and telecommunications services to customers/subscribers (e.g., a user of RedCap UE 110) who are connected to the CN 140 via base station 120.

Generally, the application server 150 may be an element offering applications that use IP bearer resources with the core network (e.g., UMTS PS domain, LTE PS data services, etc.). The application server 150 can also be configured to support one or more communication services (e.g., VoIP sessions, PTT sessions, group communication sessions, social networking services, etc.) for the RedCap UE 110 via the CN 140.

Figure 1B:
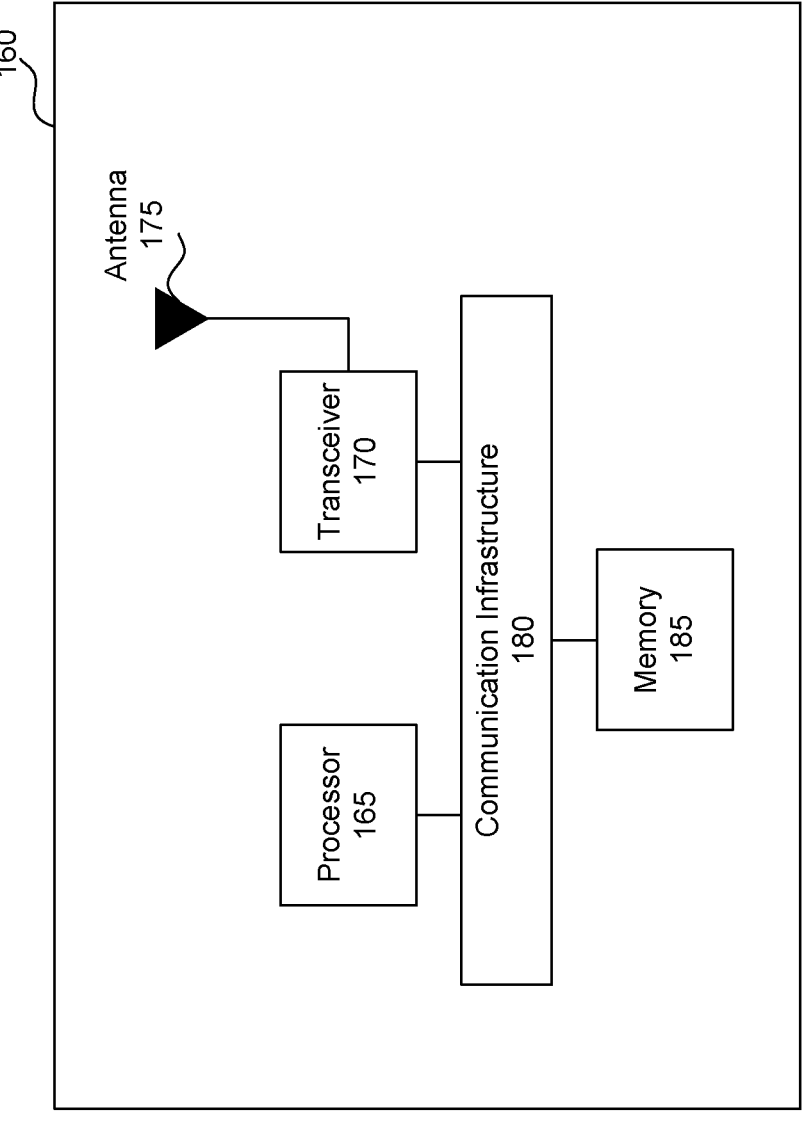

FIG. 1B illustrates a block diagram of an example wireless system 160 of an electronic device implementing measurement prioritization, according to some aspects. As a convenience and not a limitation, system 160, may be described with elements of FIG. 1A. System 160 may be RedCap UE 110 or a base station 120 of FIG. 1A. System 160 may include processor 165, transceiver 170, communication infrastructure 180, memory 185, and antenna 175 that together facilitate panel selection. Transceiver 170 transmits and receives wireless communications signals, such as 5G wireless communications signals via antenna 175. For RedCap UE 110, transceiver 170 may communicate in a HD-FDD configuration.

Communication infrastructure 180 may be a bus. Memory 185 may include random access memory (RAM) and/or cache, and may include control logic (e.g., computer software), computer instructions, and/or data. Processer 165, upon execution of the computer instructions, may be configured to perform the functionality described herein for measurement prioritization. Alternatively, processor 165 can include its own internal memory (not shown), and/or be "hard-wired" (as in a state-machine) configured to perform the functionality described herein for measurement prioritization. Antenna 175 coupled to transceiver 170, may include one or more antennas, antenna arrays, and/or panels that may be the same or different types to enable wireless communication over a wireless network.

In some aspects, RedCap UE 110 may utilize the components of wireless system 160. According to some aspects, processor 165, alone or in combination with memory 185, and/or transceiver 170, may implement measurement prioritization. This may occur when RedCap UE 110 schedules uplink transmissions. As previously explained, RedCap UE 110 may avoid scheduling uplink transmissions that may cause interference and/or collisions with SSB and/or CSI-RS related measurements. Memory 185 may store instructions for operating RedCap UE 110 to schedule uplink transmissions to avoid such interference. This may allow RedCap UE 110 to schedule uplink transmissions even when a neighboring cell's timing is unknown. Processor 165 may execute the prioritization scheduling described below.

The following flowcharts in FIGS. 2A, 2B, 2C, 3, 4, 5, 6A, 6B, 6C, 7A, 7B, 7C, 8, and 9 describe the scheduling of uplink transmissions to avoid collisions with other measurement signals. These uplink transmissions may include data communications on uplink channels and/or uplink reference signals. The uplink channels and/or uplink reference signals may include Physical Uplink Control Channel (PUCCH), Physical Uplink Shared Channel (PUSCH), Sounding Reference Signal (SRS), and/or Random Access Channel (RACH). The flowcharts below describe RedCap UE 110 preventing uplink transmissions during certain times to avoid collisions with SSB, RSSI, and/or CSI-RS related measurement symbols. This may avoid collisions with other RedCap UE 110 operating and/or performing measurements in a neighboring cell.

Figure 2A:
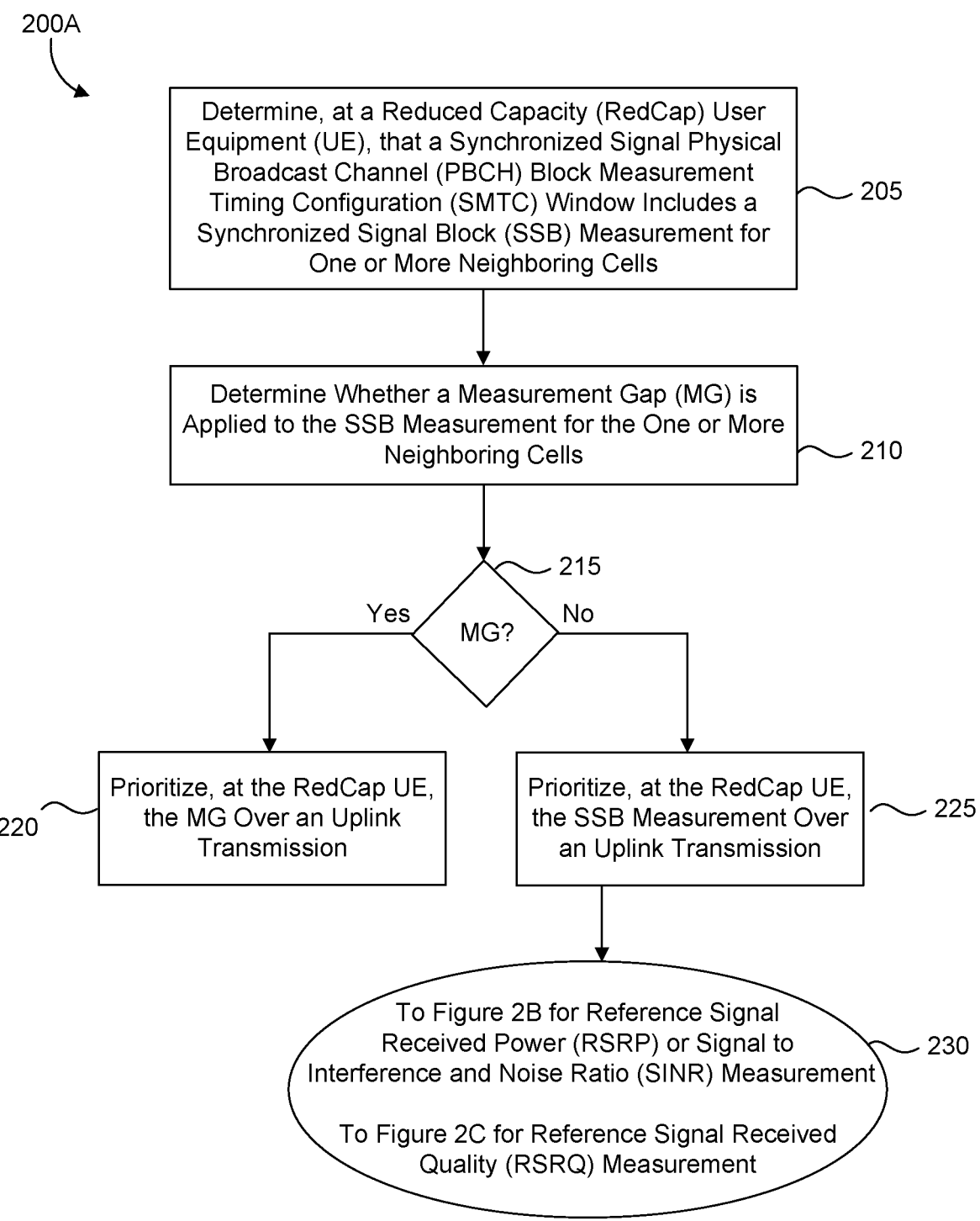
FIG. 2A illustrates a flowchart for configuring synchronization signal block (SSB) measurement prioritization at a RedCap UE based on a measurement gap, according to some aspects.

FIG. 2A illustrates a flowchart 200A for configuring synchronization signal block (SSB) measurement prioritization at a RedCap UE 110 based on a measurement gap, according to some aspects. In some aspects, RedCap UE 110 may execute flowchart 200A. Flowchart 200A shall be described with reference to RedCap UE 110; however, flowchart 200A is not limited to that example aspect. Flowchart 200A may be implemented by processor 165 (FIG. 1B). For example, processor 165 may execute instructions, stored in memory 185, to perform the functions described in flowchart 200A. Alternatively, processor 165 may be "hard-coded" to perform these functions. Additionally, flowchart 200A may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2A, as will be understood by a person of ordinary skill in the art.

At 205, RedCap UE 110 may determine that a Synchronized Signal Physical Broadcast Channel (PBCH) Block Measurement Timing Configuration (SMTC) window includes a synchronized signal block (SSB) measurement for one or more neighboring cells. The SMTC window may be a periodic window that notifies RedCap UE 110 of a measurement periodicity with SSB timing. The serving cell and/or serving base station 120A may inform RedCap UE 110 of the SMTC window. The SMTC window may indicate that a neighbor cell is using one or more SSB symbols to perform a measurement. These SSBs may not be synchronized to the current serving cell. RedCap UE 110 may not have the timing information for the neighbor cell SSBs. For example, RedCap UE 110 may identify that there are SSB symbols for measurement within the SMTC window but may not know the exact timing information within the SMTC window corresponding to the SSB symbols. This may occur because the SSB may be cell-specific. FIGS. 2A-2C, 3, and 4 address the scenario where the neighbor cell (e.g., base station 120B) SSBs are not synchronized with the current serving cell (e.g., base station 120A).

At 210, RedCap UE 110 may determine whether a measurement gap (MG) is applied to the SSB measurement for the one or more neighboring cells. A MG may be an indication identifying to the RedCap UE 110 certain symbols to preserve for SSB related measurements. For example, the serving cell may transmit an indication to RedCap UE 110 that a MG is applied. The MG may be provided via RRC signaling. In some aspects, the MG may be periodic and/or include a length duration. At 215, RedCap UE 110 may make the determination of whether a MG is applied. This may be based on an indication received from the serving cell or base station 120A.

At 220, if a MG is applied to the SSB related measurement, RedCap UE 110 may prioritize the MG over an uplink transmission. In this case, RedCap UE 110 may not perform an uplink transmission during the MG length duration.

At 225, if a MG is not applied to the SSB related measurement, RedCap UE 110 may prioritize the SSB measurement over an uplink transmission. RedCap UE 110 may prioritize the SSB measurement for the one or more neighboring cells in the SMTC window. In this case, the SSB related measurement symbols, which may include the SSB symbols, may be prioritized over the uplink transmission. RedCap UE 110 may perform this prioritization at 230. The prioritization at 230 is further described with reference to FIG. 2B and FIG. 2C. In particular, FIG. 2B describes prioritization scheduling for Reference Signal Received Power (RSRP) and/or Signal to Interference and Noise Ratio (SINR) measurements. FIG. 2C describes prioritization scheduling for Reference Signal Received Quality (RSRQ) measurement. The serving cell (e.g., base station 120A) communicating with the RedCap UE 110 may transmit a message to the RedCap UE 110 indicating that the SMTC window is configured for a RSRP, SINR, and/or RSRQ measurement.

In some aspects, RedCap UE 110 may be instructed to perform RSRP, SINR, and/or RSRQ measurements. The serving cell and/or base station 120A may instruct RedCap UE 110 to perform these measurements. When a MG is not specified for such measurements, RedCap UE 110 may prioritize the SSB related measurement symbols in the manner described in FIG. 2B and FIG. 2C.

FIG. 2B illustrates a flowchart 200B for Reference Signal Received Power (RSRP) or Signal to Interference and Noise Ratio (SINR) measurement prioritization based on SSB symbols at a RedCap UE 110, according to some aspects. In some aspects, RedCap UE 110 may execute flowchart 200B. Flowchart 200B shall be described with reference to RedCap UE 110; however, flowchart 200B is not limited to that example aspect. Flowchart 200B may be implemented by processor 165 (FIG. 1B). For example, processor 165 may execute instructions, stored in memory 185, to perform the functions described in flowchart 200B. Alternatively, processor 165 may be "hard-coded" to perform these functions. Additionally, flowchart 200B may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2B, as will be understood by a person of ordinary skill in the art.

At 235, the RedCap UE 110 may determine that the SMTC window is configured for a RSRP or SINR measurement. For example, the serving cell may transmit a message to the RedCap UE 110 indicating that the SMTC window is configured for a RSRP or SINR measurement. This determination may be made after RedCap UE 110 has determined that a MG is not applied to the SSB measurement as described with reference to FIG. 2A. In this case, the RSRP or SINR measurement may be determined using use SSB symbols. The RedCap UE 110 may perform the RSRP or SINR measurement or another RedCap UE or UE may perform the measurement.

At 240, RedCap UE 110 may determine whether a SSB timing of a serving cell servicing the RedCap UE 110 is synchronized with a SSB timing of a target neighboring cell of the one or more neighboring cells. As previously explained, the serving cell may be provided by base station 120A. The target neighboring cell may be provided by base station 120B. To determine whether base station 120A is synchronized with base station 120B for SSB timing, base station 120A may provide an indication to RedCap UE 110. For example, base station 120A may transmit a signaling message setting a flag to be interpreted by RedCap UE 110. This flag may be a "deriveSSB_IndexFromCell" value. At 245, RedCap UE 110 may check the state of this SSB index flag to determine whether the SSB timing of the serving cell is synchronized with the neighboring cell.

If the SSB timings are synchronized, RedCap UE 110 may recognize the serving cell's timing as being aligned with the neighboring cell's timing. This may allow RedCap UE 110 to identify the particular SSB symbols within the SMTC window. RedCap UE 110 may identify these SSB symbols from the neighboring cell using the timing for the SSB symbols from the serving cell. This may allow RedCap UE 110 to more precisely identify the particular SSB symbols and timing to perform measurements and/or apply prioritizations. If the SSB timings are not synchronized, RedCap UE 110 may not be able to identify the particular SSB symbols within the SMTC window. While RedCap UE 110 may recognize that SSB measurements may be performed within the SMTC window, RedCap UE 110 may not be able to identify the specific symbols.

RedCap UE 110 may check the value of the flag "deriveSSB_IndexFromCell" to determine whether the serving cell and neighboring cell have synchronized SSB timings. If the SSB index flag is enabled, the timings are synchronized and RedCap UE 110 may proceed to 250. If the SSB index flag is not enabled, the timings are not synchronized and RedCap UE 110 may proceed to 255.

At 250, if the serving cell is synchronized with the neighboring cell, the RedCap UE 110 may be prevented from performing an uplink transmission during consecutive SSB symbols, a symbol before the consecutive SSB symbols, and a symbol after the consecutive SSB symbols within the SMTC window. RedCap UE 110 may not be expected to transmit on uplink channels and/or uplink reference signals during these symbols within the SMTC window duration. In this manner, the RedCap UE 110 may prioritize the SSB measurement over the uplink transmission. The RedCap UE 110 may also provide a buffer symbol before and after one or more consecutive SSB symbols to separate other potential uplink transmissions. This may help with avoiding potential overlaps between SSB measurements and uplink transmissions.

To illustrate an example aspect, based on the recognition of a synchronized neighboring cell, RedCap UE 110 may identify four consecutive SSB symbols within the SMTC window used for measurements. RedCap UE 110 may be configured to not perform an uplink transmission during these four consecutive SSB symbols as well as during the symbol before and the symbol after the four symbols. In this manner, there may be six symbols within the SMTC window where the RedCap UE 110 does not perform an uplink transmission. The RedCap UE 110 may still may still use the other symbols in the SMTC window to perform uplink transmissions based on the precision provided by knowing that the serving cell and neighboring cell have synchronized SSB timings. It is noted that the reference to 4 consecutive symbols herein (and throughout) is just an example, and is not meant to be limiting, as any number of symbols is within the scope and spirit of the present disclosure.

In some aspects, the consecutive SSB symbols may occur at the beginning or the end of an SMTC window. For example, the consecutive SSB symbols may be the first four symbols of the SMTC window. In this case, RedCap UE 110 may not perform an uplink transmission during the symbol following the first four symbols (i.e., the fifth symbol). This may occur because RedCap UE 110 manages SSB symbols for each SMTC window without extending beyond a particular SMTC window. In an example where the consecutive SSB symbols are the last four symbols of the SMTC window, RedCap UE 110 may not perform an uplink transmission during the symbol preceding the last four symbols.

At 255, if the serving cell is not synchronized with the neighboring cell, the RedCap UE 110 may be prevented from performing an uplink transmission during the SMTC window. RedCap UE 110 may not be expected to transmit on uplink channels and/or uplink reference signals during the SMTC window duration. In this case, RedCap UE 110 may be aware that an SSB measurement is occurring during the SMTC window. Because the timings are not synchronized, however, RedCap UE 110 may not have received timing information related to the neighboring cell's SSB measurement symbols. In this case, RedCap UE 110 may identify SMTC window as a searching window. Based on the lack of exact symbol timing, RedCap UE 110 may be prevented from performing an uplink transmission during the SMTC window. RedCap UE 110 may mute uplink transmissions during the SMTC window to avoid potential interference.

In this manner, RedCap UE 110 may handle situations where the SSB timing is or is not synchronized between a serving cell and a neighboring cell. Based on whether the timing is synchronized, RedCap UE 110 may prioritize SSB measurements and/or perform uplink transmission scheduling to avoid potential signal collisions and/or interference for RSRP and/or SINR measurements. In some aspects, RedCap UE 110 may perform the RSRP and/or SINR measurements within the SMTC window.

FIG. 2C illustrates a flowchart 200C for Reference Signal Received Quality (RSRQ) measurement prioritization based on SSB symbols at a RedCap UE 110, according to some aspects. In some aspects, RedCap UE 110 may execute flowchart 200C. Flowchart 200C shall be described with reference to RedCap UE 110; however, flowchart 200C is not limited to that example aspect. Flowchart 200C may be implemented by processor 165 (FIG. 1B). For example, processor 165 may execute instructions, stored in memory 185, to perform the functions described in flowchart 200C. Alternatively, processor 165 may be "hard-coded" to perform these functions. Additionally, flowchart 200C may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2C, as will be understood by a person of ordinary skill in the art.

At 260, RedCap UE 110 may determine that the SMTC window is configured for a RSRQ measurement. For example, the serving cell may transmit a message to the RedCap UE 110 indicating that the SMTC window is configured for a RSRQ measurement. This determination may be made after RedCap UE 110 has determined that a MG is not applied to the SSB measurement as described with reference to FIG. 2A. In this case, the RSRQ measurement may be determined using use SSB symbols and/or Received Signal Strength Indicator (RSSI) symbols. The RedCap UE 110 may perform the RSRQ measurement or another RedCap UE or UE may perform the measurement.

At 265, RedCap UE 110 may determine whether a SSB timing of a serving cell servicing the RedCap UE 110 is synchronized with a SSB timing of a target neighboring cell of the one or more neighboring cells. This may occur in a similar manner as described with reference to 240 and 245 as described with reference to FIG. 2B. At 270, RedCap UE 110 may determine whether the timings are synchronized. RedCap UE 110 may check the value of the flag "deriveSS-B_IndexFromCell" to determine whether the serving cell and neighboring cell have synchronized SSB timings. If the flag is enabled, the timings are synchronized and RedCap UE 110 may proceed to 275. If the flag is not enabled, the timings are not synchronized and RedCap UE 110 may proceed to 280.

At 275, if the serving cell is synchronized with the neighboring cell, the RedCap UE 110 may be prevented from performing an uplink transmission during consecutive SSB symbols, consecutive RSSI symbols, a symbol before the consecutive SSB and consecutive RSSI symbols, and a symbol after the consecutive SSB and consecutive RSSI symbols within the SMTC window. RedCap UE 110 may not be expected to transmit on uplink channels and/or uplink reference signals during these symbols within the SMTC window duration. In this manner, the RedCap UE 110 may prioritize the SSB measurement over the uplink transmission. The RedCap UE 110 may also provide a buffer symbol before and after one or more consecutive SSB and/or RSSI symbols to separate other potential uplink transmissions. This may help with avoiding potential overlaps between RSRQ measurements and uplink transmissions.

While 275 may be similar to 250, when determining RSRQ, RedCap UE 110 may consider the RSSI symbols because the RSSI symbols are relevant to the RSRQ measurement. In this case, the RedCap UE 110 may not be expected to perform an uplink transmission for sets of SSB and/or RSSI symbols within an SMTC window.

To illustrate an example aspect, an SMTC window may be fifty symbols in duration. Based on the recognition of a synchronized neighboring cell, RedCap UE 110 may identify four consecutive SSB symbols within the SMTC window used for measurements. RedCap UE 110 may also identify another four consecutive RSSI symbols within the SMTC window used for measurements. These two groups of symbols may not be continuous and/or there may be symbols between these two groups of symbols.

RedCap UE 110 may be configured to not perform an uplink transmission during these four consecutive SSB symbols as well as during the symbol before and the symbol after the four symbols. Additionally, RedCap UE 110 may be configured to not perform an uplink transmission during the four consecutive RSSI symbols as well as during the symbol before and the symbol after the four symbols. In this manner, there may be twelve symbols within the SMTC window where the RedCap UE 110 does not perform an uplink transmission. The RedCap UE 110 may still may still use the other symbols in the SMTC window to perform uplink transmissions based on the precision provided by knowing that the serving cell and neighboring cell have synchronized SSB timings.

In some aspects, the consecutive SSB and/or RSSI symbols may occur at the beginning or the end of an SMTC window. For example, the consecutive SSB and/or RSSI symbols may be the first four symbols of the SMTC window. In this case, RedCap UE 110 may not perform an uplink transmission during the symbol following the first four symbols (i.e., the fifth symbol). This may occur because RedCap UE 110 manages SSB and/or RSSI symbols for each SMTC window without extending beyond a particular SMTC window. In an example where the consecutive SSB and/or RSSI symbols are the last four symbols of the SMTC window, RedCap UE 110 may not perform an uplink transmission during the symbol preceding the last four symbols.

At 280, if the serving cell is not synchronized with the neighboring cell, the RedCap UE 110 may be prevented from performing an uplink transmission during the SMTC window. RedCap UE 110 may not be expected to transmit on uplink channels and/or uplink reference signals during the SMTC window duration. In this case, RedCap UE 110 may be aware that an SSB and/or RSSI measurement is occurring during the SMTC window. Because the timings are not synchronized, however, RedCap UE 110 may not have received timing information related to the neighboring cell's SSB and/or RSSI measurement symbols. In this case, RedCap UE 110 may identify SMTC window as a searching window. Based on the lack of exact symbol timing, RedCap UE 110 may be prevented from performing an uplink transmission during the SMTC window. RedCap UE 110 may mute uplink transmissions during the SMTC window to avoid potential interference.

In this manner, RedCap UE 110 may handle situations where the SSB and/or RSSI timing is or is not synchronized between a serving cell and a neighboring cell. Based on whether the timing is synchronized, RedCap UE 110 may prioritize SSB and/or RSSI measurements and/or perform uplink transmission scheduling to avoid potential signal collisions and/or interference for RSRQ measurements. In some aspects, RedCap UE 110 may perform the RSRQ measurements within the SMTC window.

FIG. 3 illustrates a flowchart 300 for network scheduling of SSB measurement symbols, according to some aspects. In some aspects, serving base station 120A may execute flowchart 300. Flowchart 300 shall be described with reference to serving base station 120A; however, flowchart 300 is not limited to that example aspect. Flowchart 300 may be implemented by processor 165 (FIG. 1B). For example, processor 165 may execute instructions, stored in memory 185, to perform the functions described in flowchart 300. Alternatively, processor 165 may be "hard-coded" to perform these functions. Additionally, flowchart 300 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In executing flowchart 300, a network such as CN 140 may schedule SSB related measurement symbols so that they do not collide with configured and/or scheduled uplink transmissions. For example, CN 140 may monitor and execute communications between base stations 120 to schedule uplink transmissions. For example, CN 140 may schedule RedCap UE 110 to perform uplink transmissions outside of the SMTC window. In this manner, RedCap UE 110 may avoid transmitting uplink transmissions during times reserved for SSB related measurement symbols. A serving cell corresponding to base station 120A may provide this indication to RedCap UE 110.

At 305, a serving cell communicating with a RedCap UE 110 may receive synchronized signal block (SSB) measurement timing from a neighboring cell. Base station 120A may provide the serving cell while base station 120B may provide the neighboring cell. In some aspects, base station 120A may receive the timing information from base station 120B via CN 140.

At 310, the serving cell may generate a schedule for uplink transmissions from the RedCap UE 110 such that the uplink transmissions do not collide with SSB symbols from the SSB measurement timing. For example, the serving cell may indicate that RedCap UE 110 should not perform an uplink transmission during a particular SMTC window. Rather, the schedule may indicate that RedCap UE 110 should perform uplink transmissions outside of the SMTC window. At 315, the serving cell may transmit the schedule for uplink transmissions to the RedCap UE 110. In this manner, the network, such as CN 140, may schedule SSB related measurement symbols so that they do not collie with scheduled uplink transmissions.

FIG. 4 illustrates a flowchart 400 for prioritizing uplink transmission at a RedCap UE 110 over SSB measurement symbols, according to some aspects. In some aspects, RedCap UE 110 may execute flowchart 400. Flowchart 400 shall be described with reference to RedCap UE 110; however, flowchart 400 is not limited to that example aspect. Flowchart 400 may be implemented by processor 165 (FIG. 1B). For example, processor 165 may execute instructions, stored in memory 185, to perform the functions described in flowchart 400. Alternatively, processor 165 may be "hardcoded" to perform these functions. Additionally, flowchart 400 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, RedCap UE 110 may prioritize uplink transmissions over SSB measurement. In this case, the SSB related measurement symbols may have a lower priority than uplink transmission symbols. Within an SMTC window, a downlink measurement may be performed outside of the symbols designated for uplink transmissions. The downlink measurements may include a RSRP and/or SINR measurement based on SSB symbols and/or a RSRQ measurement based on SSB and/or RSSI symbols.

At 410, RedCap UE 110 may perform at the RedCap UE 110, an uplink transmission using one or more symbols within an SMTC window. This uplink transmission may be prioritized over downlink measurements. In this case, RedCap UE 110 may not have SSB timing information from a neighboring cell. Rather, RedCap UE 110 may rely on timing from the serving cell. RedCap UE 110 may prioritize the uplink transmissions within the SMTC window. At 415, RedCap UE 110 may perform an SSB measurement within the SMTC window outside of the one or more symbols used for the uplink transmission. For example, RedCap UE 110 may identify one or more symbols within the SMTC window that have not been designated for uplink transmissions.

Figure 5:
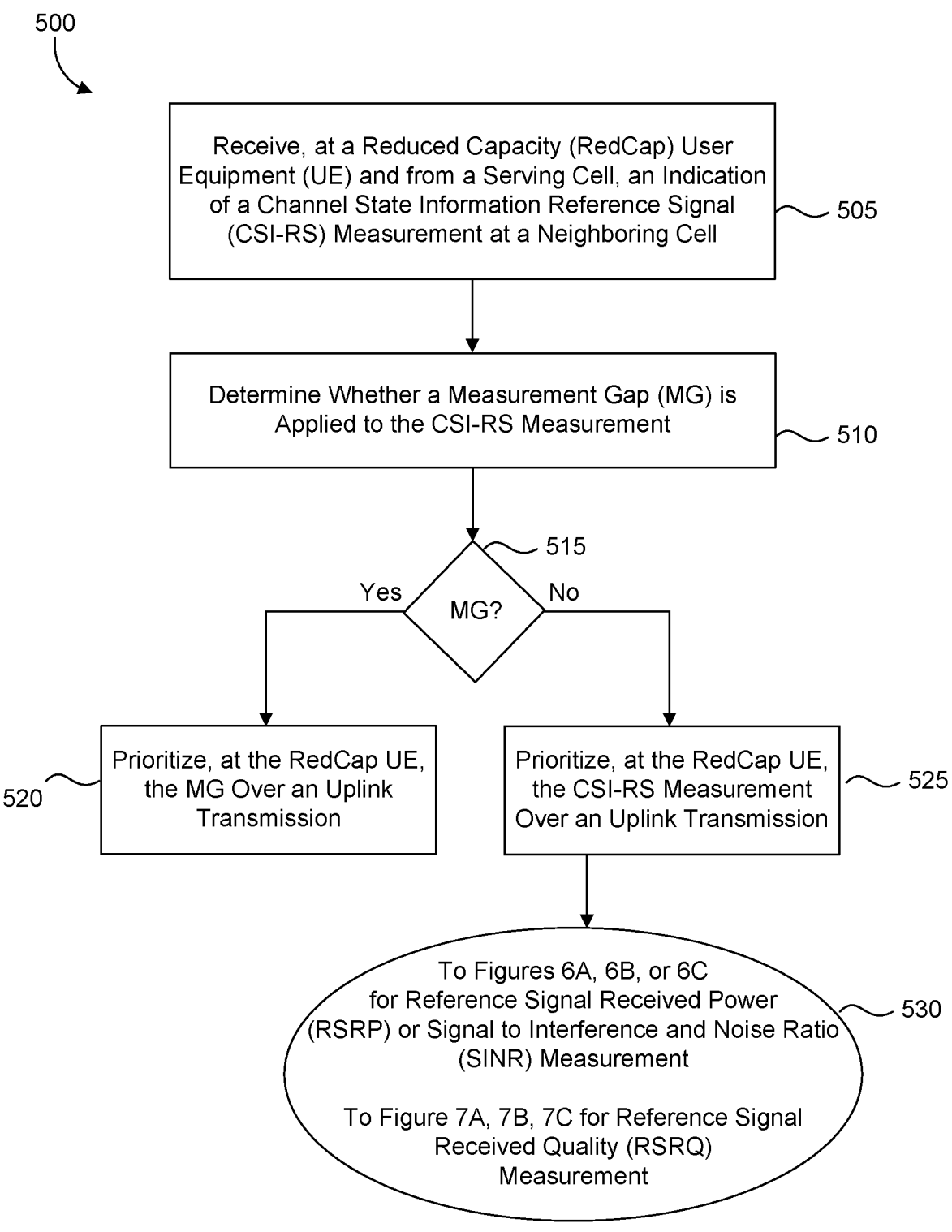
FIG. 5 illustrates a flowchart for configuring channel state information reference signal (CSI-RS) measurement prioritization at a RedCap UE based on a measurement gap, according to some aspects.

FIG. 5 illustrates a flowchart 500 for configuring channel state information reference signal (CSI-RS) measurement prioritization at a RedCap UE 110 based on a measurement gap, according to some aspects. In some aspects, RedCap UE 110 may execute flowchart 500. Flowchart 500 shall be described with reference to RedCap UE 110; however, flowchart 500 is not limited to that example aspect. Flowchart 500 may be implemented by processor 165 (FIG. 1B). For example, processor 165 may execute instructions, stored in memory 185, to perform the functions described in flowchart 500. Alternatively, processor 165 may be "hardcoded" to perform these functions. Additionally, flowchart 500 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 505, RedCap UE 110 may receive an indication from a serving cell of a CSI-RS measurement at a neighboring cell. Base station 120A may provide the serving cell while base station 120B may provide the neighboring cell. In contrast to a SSB measurements, CSI-RS measurement may be based on scheduling. That is, CSI-RS measurements may not be periodic like SMTC windows. CSI-RS measurements may be semi-static. In this case, base station 120A may communicate with base station 120B to identify the neighboring cell's CSI-RS configuration. This CSI-RS configuration may indicate the symbols where a CSI-RS measurement is being performed at the neighboring cell. Base station 120A may then communicate this timing to RedCap UE 110. As will be further explained below, base station 120A may communicate the CSI-RS configuration with or without using a measurement gap (MG).

At 510, RedCap UE 110 may determine whether a measurement gap (MG) is applied to the CSI-RS measurement. A MG may be an indication identifying to the RedCap UE 110 certain symbols to preserve for CSI-RS related measurements. For example, the serving cell may transmit an indication to RedCap UE 110 that a MG is applied. The MG may be provided via RRC signaling. In some aspects, the MG may be periodic and/or include a length duration. At 515, RedCap UE 110 may make the determination of whether a MG is applied. This may be based on an indication received from the serving cell or base station 120A.

At 520, if a MG is applied to the CSI-RS related measurement, RedCap UE 110 may prioritize the MG over an uplink transmission. In this case, RedCap UE 110 may not perform an uplink transmission during the MG length duration.

At 525, if a MG is not applied to the CSI-RS related measurement, RedCap UE 110 may prioritize the CSI-RS measurement over an uplink transmission. In this case, the CSI-RS related measurement symbols, which may include the CSI-RS symbols, may be prioritized over the uplink transmission. RedCap UE 110 may perform this prioritization at 530. The prioritization at 530 is further described with reference to FIGS. 6A, 6B, 6C, 7A, 7B, and 7C. In particular, FIGS. 6A, 6B, and 6C describe prioritization scheduling for Reference Signal Received Power (RSRP) and/or Signal to Interference and Noise Ratio (SINR) measurements. FIGS. 7A, 7B, and 7C describe prioritization scheduling for Reference Signal Received Quality (RSRQ) measurement. The serving cell (e.g., base station 120A) communicating with the RedCap UE 110 may transmit a message to the RedCap UE 110 indicating that the CSI-RS measurement is configured for a RSRP, SINR, and/or RSRQ measurement.

In some aspects, RedCap UE 110 may be instructed to perform RSRP, SINR, and/or RSRQ measurements. The serving cell and/or base station 120A may instruct RedCap UE 110 to perform these measurements. When a MG is not specified for such measurements, RedCap UE 110 may prioritize the SSB related measurement symbols in the manner described in FIGS. 6A, 6B, 6C, 7A, 7B, and/or 7C.

FIG. 6A illustrates a flowchart 600A for RSRP or SINR measurement prioritization based on CSI-RS resource symbols at a RedCap UE 110, according to some aspects. In some aspects, RedCap UE 110 may execute flowchart 600A. Flowchart 600A shall be described with reference to RedCap UE 110; however, flowchart 600A is not limited to that example aspect. Flowchart 600A may be implemented by processor 165 (FIG. 1B). For example, processor 165 may execute instructions, stored in memory 185, to perform the functions described in flowchart 600A. Alternatively, processor 165 may be "hard-coded" to perform these functions. Additionally, flowchart 600A may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6A, as will be understood by a person of ordinary skill in the art.

At 605, RedCap UE 110 may determine that the CSI-RS measurement is a RSRP or SINR measurement. This determination may be made after RedCap UE 110 has determined that a MG is not applied to the CSI-RS measurement as described with reference to FIG. 5. In this case, the RSRP or SINR measurement may be determined using use CSI-RS symbols. The RSRP or SINR measurement may occur at the neighboring cell. In some aspects, RedCap UE 110 may perform a RSRP or SINR measurement.

At 610, RedCap UE 110 may receive from a serving cell servicing the RedCap UE 110 a CSI-RS configuration corresponding to a neighboring cell. As previously explained, RedCap UE 110 may be informed of the neighboring cell CSI-RS measurement configuration. The configuration may provide timings corresponding to CSI-RS symbols. Based on this information, RedCap UE 110 may avoid uplink transmissions that would interfere with and/or collide with CSI-RS resource symbols.

At 615, RedCap UE 110 may be prevented from performing an uplink transmission during consecutive CSI-RS resource symbols of the CSI-RS configuration, a symbol before the consecutive CSI-RS resource symbols, and a symbol after the consecutive CSI-RS resource symbols. The symbol before and/or after the consecutive CSI-RS resource symbols may be an orthogonal frequency-division multiplexing (OFDM) symbol. RedCap UE 110 may not be expected to transmit on uplink channels and/or uplink reference signals during these symbols to avoid collisions. In this manner, the RedCap UE 110 may prioritize the CSI-RS measurement over the uplink transmission. The RedCap UE 110 may also provide a buffer symbol before and after one or more consecutive CSI-RS resource symbols to separate other potential uplink transmissions. This may help with avoiding potential overlaps between CSI-RS measurements and uplink transmissions.

To illustrate an example aspect, based on the recognition of the CSI-RS timing information from the neighboring cell, RedCap UE 110 may identify four consecutive CSI-RS symbols used for measurements. RedCap UE 110 may be configured to not perform an uplink transmission during these four consecutive CSI-RS symbols as well as during the OFDM symbol before and the OFDM symbol after the four symbols. In this manner, there may be six symbols where the RedCap UE 110 does not perform an uplink transmission. Because the RedCap UE 110 is informed of the timing of the CSI-RS resource symbols, RedCap UE 110 may specifically identify the symbols to not perform an uplink transmission.

In this manner, RedCap UE 110 may handle situations where CSI-RS resource symbols are used to perform RSRP and/or SINR measurements. RedCap UE 110 may prioritize CSI-RS measurements and/or perform uplink transmission scheduling to avoid potential signal collisions and/or interference for RSRP and/or SINR measurements.

FIG. 6B illustrates a flowchart 600B for RSRP or SINR measurement prioritization based on a CSI-RS search window at a RedCap UE 110, according to some aspects. In some aspects, RedCap UE 110 may execute flowchart 600B. Flowchart 600B shall be described with reference to RedCap UE 110; however, flowchart 600B is not limited to that example aspect. Flowchart 600B may be implemented by processor 165 (FIG. 1B). For example, processor 165 may execute instructions, stored in memory 185, to perform the functions described in flowchart 600B. Alternatively, processor 165 may be "hard-coded" to perform these functions. Additionally, flowchart 600B may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6B, as will be understood by a person of ordinary skill in the art.

At 620, RedCap UE 110 may determine that the CSI-RS measurement is a RSRP or SINR measurement. This determination may be made after RedCap UE 110 has determined that a MG is not applied to the CSI-RS measurement as described with reference to FIG. 5. In this case, the RSRP or SINR measurement may be determined using use CSI-RS symbols. The RSRP or SINR measurement may occur at the neighboring cell. In some aspects, RedCap UE 110 may perform a RSRP or SINR measurement.

At 625, RedCap UE 110 may receive from a serving cell servicing the RedCap UE 110 a CSI-RS configuration corresponding to a neighboring cell. As previously explained, RedCap UE 110 may be informed of the neighboring cell CSI-RS measurement configuration. The configuration may provide timings corresponding to CSI-RS symbols. Based on this information, RedCap UE 110 may avoid uplink transmissions that would interfere with and/or collide with CSI-RS resource symbols.

At 630, RedCap UE 110 may identify a CSI-RS search window including symbols indicated by the CSI-RS configuration. As previously explained, the CSI-RS resource symbols indicated by the CSI-RS configuration may not be periodic. Rather, the CSI-RS configuration may indicate particular timings for CSI-RS resource symbols. By analyzing these timings, RedCap UE 110 may identify a CSI-RS search window which includes the symbols and avoid uplink transmissions during this CSI-RS search window. RedCap UE 110 may operate in this manner to avoid the potentially unnecessary processing of individually identify each grouping of CSI-RS symbols and providing single symbol buffers for each grouping. Instead, RedCap UE 110 may define the CSI-RS search window to encompass each of the CSI-RS resource symbols in the CSI-RS configuration received from the serving cell. In some aspects, the CSI-RS search window may be defined as a time period, such as, for example, a 5 ms window.

To illustrate an example aspect, a first CSI-RS resource symbol may be identified in a first position of the CSI-RS configuration, a second CSI-RS resource symbol may be identified in a fifth position, and a third CSI-RS resource symbol may be identified in a seventh position. By identifying this grouping of CSI-RS resource symbols, RedCap UE 110 may define a CSI-RS search window encompassing the three CSI-RS resource symbols. For example, the CSI-RS search window may extend from the first position to the seventh position. In some aspects, RedCap UE 110 may also include a buffer symbol before and/or after the CSI-RS search window.

At 635, RedCap UE 110 may prevent RedCap UE 110 from performing an uplink transmissions during the CSI-RS search window. RedCap UE 110 may not perform an uplink transmission during the CSI-RS search window and/or any buffer symbols. In this manner, the RedCap UE 110 may prioritize the CSI-RS measurement over the uplink transmission. By using the search window configuration, RedCap UE 110 may avoiding potential overlaps between CSI-RS measurements and uplink transmissions.

In this manner, RedCap UE 110 may handle situations where CSI-RS resource symbols are used to perform RSRP and/or SINR measurements. RedCap UE 110 may use the CSI-RS search window to prioritize CSI-RS measurements. RedCap UE 110 may perform uplink transmission scheduling to avoid potential signal collisions and/or interference for RSRP and/or SINR measurements.

FIG. 6C illustrates a flowchart for RSRP or SINR measurement prioritization based on CSI-RS resource symbols within a CSI-RS search window at a RedCap UE 110, according to some aspects. In some aspects, RedCap UE 110 may execute flowchart 600C. Flowchart 600C shall be described with reference to RedCap UE 110; however, flowchart 600C is not limited to that example aspect. Flowchart 600C may be implemented by processor 165 (FIG. 1B). For example, processor 165 may execute instructions, stored in memory 185, to perform the functions described in flowchart 600C. Alternatively, processor 165 may be "hardcoded" to perform these functions. Additionally, flowchart 600C may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6C, as will be understood by a person of ordinary skill in the art.

At 640, RedCap UE 110 may determine that the CSI-RS measurement is a RSRP or SINR measurement. This determination may be made after RedCap UE 110 has determined that a MG is not applied to the CSI-RS measurement as described with reference to FIG. 5. In this case, the RSRP or SINR measurement may be determined using use CSI-RS symbols. The RSRP or SINR measurement may occur at the neighboring cell. In some aspects, RedCap UE 110 may perform a RSRP or SINR measurement.

At 645, RedCap UE 110 may receive from a serving cell servicing the RedCap UE 110 a CSI-RS configuration corresponding to a neighboring cell. As previously explained, RedCap UE 110 may be informed of the neighboring cell CSI-RS measurement configuration. The configuration may provide timings corresponding to CSI-RS symbols. Based on this information, RedCap UE 110 may avoid uplink transmissions that would interfere with and/or collide with CSI-RS resource symbols.

At 650, RedCap UE 110 may identify a CSI-RS search window including symbols indicated by the CSI-RS configuration. As previously explained, the CSI-RS resource symbols indicated by the CSI-RS configuration may not be periodic. Rather, the CSI-RS configuration may indicate particular timings for CSI-RS resource symbols. By analyzing these timings, RedCap UE 110 may identify a CSI-RS search window which includes the symbols. The CSI-RS search window may aid RedCap UE 110 in determining the symbols and/or buffers to use to avoid uplink transmissions. The CSI-RS search window may encompass each of the CSI-RS resource symbols in the CSI-RS configuration received from the serving cell. In some aspects, the CSI-RS search window may be defined as a time period, such as, for example, a 5 ms window.

To illustrate an example aspect, a first CSI-RS resource symbol may be identified in a first position of the CSI-RS configuration, a second CSI-RS resource symbol may be identified in a fifth position, and a third CSI-RS resource symbol may be identified in a seventh position. By identifying this grouping of CSI-RS resource symbols, RedCap UE 110 may define a CSI-RS search window encompassing the three CSI-RS resource symbols. For example, the CSI-RS search window may extend from the first position to the seventh position. In some aspects, RedCap UE 110 may also include a buffer symbol before and/or after the CSI-RS search window.

At 655, RedCap UE 110 may prevent RedCap UE 110 from performing an uplink transmissions during consecutive CSI-RS resource symbols, a symbol before the consecutive CSI-RS resource symbols, and a symbol after the consecutive CSI-RS resource symbols within the CSI-RS search window. This may be similar to 615 as described with reference to FIG. 6A. At 655, however, RedCap UE 110 may also use the CSI-RS search window organization to group the CSI-RS resource symbols. Using the search window configuration may allow RedCap UE 110 to avoid potential overlaps between CSI-RS measurements and uplink transmissions. In this manner, the RedCap UE 110 may prioritize the CSI-RS measurement over the uplink transmission.

Returning to the example aspect described with reference to 650, RedCap UE 110 may identify three CSI-RS resource symbols in the CSI-RS search window. These three CSI-RS resource symbols may be identified at the first position, the fifth position, and the seventh position. At 655, RedCap UE 110 may identify an OFDM symbol before and after each of the three CSI-RS resource symbols to not perform an uplink transmission. This OFDM symbol may represent timing where the UE is not expected to transmit an uplink transmission. For example, RedCap UE 110 may identify OFDM symbols at the zero, second, fourth, sixth, and eighth positions. RedCap UE 110 may be prevented from performing uplink transmissions during these symbols. Because the RedCap UE 110 is informed of the timing of the CSI-RS resource symbols, RedCap UE 110 may specifically identify the symbols and corresponding buffer symbols within a search window to not perform an uplink transmission.

In this manner, RedCap UE 110 may handle situations where CSI-RS resource symbols are used to perform RSRP and/or SINR measurements. RedCap UE 110 may use the CSI-RS search window to prioritize CSI-RS measurements. RedCap UE 110 may perform uplink transmission scheduling to avoid potential signal collisions and/or interference for RSRP and/or SINR measurements.

FIG. 7A illustrates a flowchart 700A for RSRQ measurement prioritization based on CSI-RS resource symbols at a RedCap UE 110, according to some aspects. In some aspects, RedCap UE 110 may execute flowchart 700A. Flowchart 700A shall be described with reference to RedCap UE 110; however, flowchart 700A is not limited to that example aspect. Flowchart 700A may be implemented by processor 165 (FIG. 1B). For example, processor 165 may execute instructions, stored in memory 185, to perform the functions described in flowchart 700A. Alternatively, processor 165 may be "hard-coded" to perform these functions. Additionally, flowchart 700A may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7A, as will be understood by a person of ordinary skill in the art.

At 705, RedCap UE 110 may determine that the CSI-RS measurement is a RSRQ measurement. This determination may be made after RedCap UE 110 has determined that a MG is not applied to the CSI-RS measurement as described with reference to FIG. 5. In this case, the RSRQ measurement may be determined using use CSI-RS and/or RSSI symbols. The RSRQ measurement may occur at the neighboring cell. In some aspects, RedCap UE 110 may perform a RSRQ measurement.

At 710, RedCap UE 110 may receive from a serving cell servicing the RedCap UE 110 a CSI-RS and RSSI configuration corresponding to a neighboring cell. As previously explained, RedCap UE 110 may be informed of the neighboring cell CSI-RS and RSSI measurement configuration. The configuration may provide timings corresponding to CSI-RS and/or RSSI symbols. Based on this information, RedCap UE 110 may avoid uplink transmissions that would interfere with and/or collide with CSI-RS resource symbols and/or RSSI measurement symbols.

At 715, RedCap UE 110 may be prevented from performing an uplink transmission during consecutive CSI-RS resource symbols of the CSI-RS and RSSI configuration, consecutive RSSI symbols of the CSI-RS and RSSI configuration, a symbol before the consecutive CSI-RS resource and consecutive RSSI symbols, and a symbol after the consecutive CSI-RS resource and consecutive RSSI symbols. The symbol before and/or after the consecutive CSI-RS resource and consecutive RSSI symbols may be an OFDM symbol. RedCap UE 110 may not be expected to transmit on uplink channels and/or uplink reference signals during these symbols to avoid collisions. In this manner, the RedCap UE 110 may prioritize the CSI-RS and/or RSSI measurement over the uplink transmission. The RedCap UE 110 may also provide a buffer symbol before and after one or more consecutive CSI-RS resource and/or RSSI measurement symbols to separate other potential uplink transmissions. This may help with avoiding potential overlaps between CSI-RS and/or RSSI measurements and uplink transmissions.

Similar to 275 as described with reference to FIG. 2C, RedCap UE 110 may identify different groupings of CSI-RS and/or RSSI symbols. This may be based on the CSI-RS and/or RSSI timing information from the neighboring cell. To illustrate an example aspect, RedCap UE 110 may identify four consecutive CSI-RS symbols used for measurements. RedCap UE 110 may also identify three consecutive RSSI symbols. RedCap UE 110 may be configured to not perform an uplink transmission during the four consecutive CSI-RS symbols as well as during the OFDM symbol before and the OFDM symbol after the four symbols. Further, RedCap UE 110 may be configured to not perform an uplink transmission during the three consecutive RSSI symbols as well as during the OFDM symbol before and the OFDM symbol after the three symbols. Because the RedCap UE 110 is informed of the timing of the CSI-RS resource and/or RSSI measurement symbols, RedCap UE 110 may specifically identify the symbols to not perform an uplink transmission.

In this manner, RedCap UE 110 may handle situations where CSI-RS resource symbols and/or RSSI measurement symbols are used to perform RSRQ measurements. RedCap UE 110 may prioritize CSI-RS and/or RSSI measurements and/or perform uplink transmission scheduling to avoid potential signal collisions and/or interference for RSRQ measurements.

FIG. 7B illustrates a flowchart 700B for RSRQ measurement prioritization based on a CSI-RS search window at a RedCap UE 110, according to some aspects. In some aspects, RedCap UE 110 may execute flowchart 700B. Flowchart 700B shall be described with reference to RedCap UE 110; however, flowchart 700B is not limited to that example aspect. Flowchart 700B may be implemented by processor 165 (FIG. 1B). For example, processor 165 may execute instructions, stored in memory 185, to perform the functions described in flowchart 700B. Alternatively, processor 165 may be "hard-coded" to perform these functions. Additionally, flowchart 700B may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7B, as will be understood by a person of ordinary skill in the art.

At 720, RedCap UE 110 may determine that the CSI-RS measurement is a RSRQ measurement. This determination may be made after RedCap UE 110 has determined that a MG is not applied to the CSI-RS measurement as described with reference to FIG. 5. In this case, the RSRQ measurement may be determined using use CSI-RS and/or RSSI symbols. The RSRQ measurement may occur at the neighboring cell. In some aspects, RedCap UE 110 may perform a RSRQ measurement.

At 725, RedCap UE 110 may receive from a serving cell servicing the RedCap UE 110 a CSI-RS configuration corresponding to a neighboring cell. As previously explained, RedCap UE 110 may be informed of the neighboring cell CSI-RS measurement configuration. Based on this information, RedCap UE 110 may avoid uplink transmissions that would interfere with and/or collide with CSI-RS resource symbols. In some aspects, the CSI-RS configuration may also include a RSSI symbol configuration. The configuration may provide timings corresponding to CSI-RS and/or RSSI symbols. The CSI-RS configuration may include an indication of the RSSI measurement symbols along with the CSI-RS resource symbols.

At 730, RedCap UE 110 may identify a CSI-RS search window including symbols indicated by the CSI-RS configuration. As previously explained, the CSI-RS resource symbols indicated by the CSI-RS configuration may not be periodic. Rather, the CSI-RS configuration may indicate particular timings for CSI-RS resource symbols. By analyzing these timings, RedCap UE 110 may identify a CSI-RS search window which includes the symbols and avoid uplink transmissions during this CSI-RS search window. RSSI measurement symbols may also be identified within the CSI-RS search window. RedCap UE 110 may operate in this manner to avoid the potentially unnecessary processing of individually identify each grouping of CSI-RS symbols and/or RSSI symbols and providing single symbol buffers for each grouping. Instead, RedCap UE 110 may define the CSI-RS search window to encompass each of the CSI-RS resource symbols and/or RSSI symbols in the CSI-RS configuration received from the serving cell. In some aspects, the CSI-RS search window may be defined as a time period, such as, for example, a 5 ms window.

To illustrate an example aspect, a first CSI-RS resource symbol may be identified in a first position of the CSI-RS configuration, a second CSI-RS resource symbol may be identified in a fifth position, and a third CSI-RS resource symbol may be identified in a seventh position. By identifying this grouping of CSI-RS resource symbols, RedCap UE 110 may define a CSI-RS search window encompassing the three CSI-RS resource symbols. For example, the CSI-RS search window may extend from the first position to the seventh position. In some aspects, RedCap UE 110 may also include a buffer symbol before and/or after the CSI-RS search window. In some aspects, RSSI measurement symbols may also be within the CSI-RS search window.

At 735, RedCap UE 110 may prevent RedCap UE 110 from performing an uplink transmissions during the CSI-RS search window. RedCap UE 110 may not perform an uplink transmission during the CSI-RS search window and/or any buffer symbols. In this manner, the RedCap UE 110 may prioritize the CSI-RS measurement over the uplink transmission. By using the search window configuration, RedCap UE 110 may avoiding potential overlaps between CSI-RS and/or RSSI measurements and uplink transmissions.

In this manner, RedCap UE 110 may handle situations where CSI-RS resource symbols and/or RSSI measurement symbols are used to perform RSRQ measurements. RedCap UE 110 may use the CSI-RS search window to prioritize CSI-RS and/or RSSI measurements. RedCap UE 110 may perform uplink transmission scheduling to avoid potential signal collisions and/or interference for RSRQ measurements.

FIG. 7C illustrates a flowchart 700C for RSRQ measurement prioritization based on CSI-RS resource symbols within a CSI-RS search window at a RedCap UE 110, according to some aspects. In some aspects, RedCap UE 110 may execute flowchart 700C. Flowchart 700C shall be described with reference to RedCap UE 110; however, flowchart 700C is not limited to that example aspect. Flowchart 700C may be implemented by processor 165 (FIG. 1B). For example, processor 165 may execute instructions, stored in memory 185, to perform the functions described in flowchart 700C. Alternatively, processor 165 may be "hardcoded" to perform these functions. Additionally, flowchart 700C may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7C, as will be understood by a person of ordinary skill in the art.

At 740, RedCap UE 110 may determine that the CSI-RS measurement is a RSRQ measurement. This determination may be made after RedCap UE 110 has determined that a MG is not applied to the CSI-RS measurement as described with reference to FIG. 5. In this case, the RSRQ measurement may be determined using use CSI-RS and/or RSSI symbols. The RSRQ measurement may occur at the neighboring cell. In some aspects, RedCap UE 110 may perform a RSRQ measurement.

At 745, RedCap UE 110 may receive from a serving cell servicing the RedCap UE 110 a CSI-RS and RSSI configuration corresponding to a neighboring cell. As previously explained, RedCap UE 110 may be informed of the neighboring cell CSI-RS and RSSI measurement configuration. The configuration may provide timings corresponding to CSI-RS and/or RSSI symbols. Based on this information, RedCap UE 110 may avoid uplink transmissions that would interfere with and/or collide with CSI-RS resource symbols and/or RSSI measurement symbols.

At 750, RedCap UE 110 may identify a CSI-RS search window including symbols indicated by CSI-RS symbols of the CSI-RS and RSSI configuration. As previously explained, the CSI-RS resource symbols indicated by the CSI-RS configuration may not be periodic. Rather, the CSI-RS configuration may indicate particular timings for CSI-RS resource symbols. By analyzing these timings, RedCap UE 110 may identify a CSI-RS search window which includes the symbols. While the CSI-RS and RSSI configuration may include timings for CSI-RS and RSSI symbols, RedCap UE 110 may use the CSI-RS symbols to identify the CSI-RS search window. The CSI-RS search window may aid RedCap UE 110 in determining the symbols and/or buffers to use to avoid uplink transmissions. The CSI-RS search window may encompass each of the CSI-RS resource symbols and/or RSSI symbols in the CSI-RS and RSSI configuration received from the serving cell. In some aspects, the CSI-RS search window may be defined as a time period, such as, for example, a 5 ms window.

To illustrate an example aspect, a first CSI-RS resource symbol may be identified in a first position of the CSI-RS configuration, a second CSI-RS resource symbol may be identified in a fifth position, and a third CSI-RS resource symbol may be identified in a seventh position. By identifying this grouping of CSI-RS resource symbols, RedCap UE 110 may define a CSI-RS search window encompassing the three CSI-RS resource symbols. For example, the CSI-RS search window may extend from the first position to the seventh position. In some aspects, RedCap UE 110 may also include a buffer symbol before and/or after the CSI-RS search window. In some aspects, RSSI measurement symbols may also be within the CSI-RS search window.

At 755, RedCap UE 110 may be prevented from performing an uplink transmission during consecutive CSI-RS resource symbols, consecutive RSSI symbols, a symbol before the consecutive CSI-RS resource and consecutive RSSI symbols, and a symbol after the consecutive CSI-RS resource and consecutive RSSI symbols within the CSI-RS search window. This may be similar to 655 as described with reference to FIG. 6C. At 755, however, RedCap UE 110 may also use the CSI-RS search window organization to group the CSI-RS resource symbols and RSSI measurement symbols. Using the search window configuration may allow RedCap UE 110 to avoid potential overlaps between CSI-RS and/or RSSI measurements and uplink transmissions. In this manner, the RedCap UE 110 may prioritize the CSI-RS and/or RSSI measurements over the uplink transmission.

Similar to 715 as described with reference to FIG. 7A, RedCap UE 110 may identify different groupings of CSI-RS and/or RSSI symbols. At 755, these different groupings may be within the CSI-RS search window. This may be based on the CSI-RS and/or RSSI timing information from the neighboring cell. To illustrate an example aspect, RedCap UE 110 may identify four consecutive CSI-RS symbols used for measurements. RedCap UE 110 may also identify three consecutive RSSI symbols. These CSI-RS and RSSI symbols may be within the CSI-RS search window identified at 750. RedCap UE 110 may be configured to not perform an uplink transmission during the four consecutive CSI-RS symbols as well as during the OFDM symbol before and the OFDM symbol after the four symbols. Further, RedCap UE 110 may be configured to not perform an uplink transmission during the three consecutive RSSI symbols as well as during the OFDM symbol before and the OFDM symbol after the three symbols. Because the RedCap UE 110 is informed of the timing of the CSI-RS resource and/or RSSI measurement symbols, RedCap UE 110 may specifically identify the symbols within the CSI-RS search window to not perform an uplink transmission.

In this manner, RedCap UE 110 may handle situations where CSI-RS resource symbols and/or RSSI measurement symbols are used to perform RSRQ measurements. RedCap UE 110 may use the CSI-RS search window to prioritize CSI-RS and/or RSSI measurements. RedCap UE 110 may perform uplink transmission scheduling to avoid potential signal collisions and/or interference for RSRQ measurements.

FIG. 8 illustrates a flowchart 800 for network scheduling of CSI-RS measurement symbols, according to some aspects. In some aspects, serving base station 120A may execute flowchart 800. Flowchart 800 shall be described with reference to serving base station 120A; however, flowchart 800 is not limited to that example aspect. Flowchart 800 may be implemented by processor 165 (FIG. 1B). For example, processor 165 may execute instructions, stored in memory 185, to perform the functions described in flowchart 800. Alternatively, processor 165 may be "hard-coded" to perform these functions. Additionally, flowchart 800 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 8, as will be understood by a person of ordinary skill in the art.

In executing flowchart 800, a network such as CN 140 may schedule CSI-RS related measurement symbols so that they do not collide with configured and/or scheduled uplink transmissions. For example, CN 140 may monitor and execute communications between base stations 120 to schedule uplink transmissions. For example, CN 140 may schedule RedCap UE 110 to perform uplink transmissions when CSI-RS measurements are not occurring. In this manner, RedCap UE 110 may avoid transmitting uplink transmissions during times reserved for CSI-RS related measurement symbols. A serving cell corresponding to base station 120A may provide this indication to RedCap UE 110.

At 805, a serving cell communicating with a RedCap UE 110 may receive CSI-RS measurement timing from a neighboring cell. Base station 120A may provide the serving cell while base station 120B may provide the neighboring cell. In some aspects, base station 120A may receive the timing information from base station 120B via CN 140.

At 810, the serving cell may generate a schedule for uplink transmissions from the RedCap UE 110 such that the uplink transmissions do not collide with CSI-RS measurement symbols from the CSI-RS measurement timing. For example, the serving cell may indicate that RedCap UE 110 should not perform an uplink transmission during the times indicated by the neighboring cell. Rather, the schedule may indicate that RedCap UE 110 should perform uplink transmissions on available symbols that have not been reserved for CSI-RS measurement. At 815, the serving cell may transmit the schedule for uplink transmissions to the RedCap UE 110. In this manner, the network, such as CN 140, may schedule CSI-RS related measurement symbols so that they do not collie with scheduled uplink transmissions.

FIG. 9 illustrates a flowchart 900 for prioritizing uplink transmission at a RedCap UE 110 over CSI-RS measurement symbols, according to some aspects. In some aspects, RedCap UE 110 may execute flowchart 900. Flowchart 900 shall be described with reference to RedCap UE 110; however, flowchart 900 is not limited to that example aspect. Flowchart 900 may be implemented by processor 165 (FIG. 1B). For example, processor 165 may execute instructions, stored in memory 185, to perform the functions described in flowchart 900. Alternatively, processor 165 may be "hard-coded" to perform these functions. Additionally, flowchart 900 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 9, as will be understood by a person of ordinary skill in the art.

At 905, RedCap UE 110 may prioritize uplink transmissions over CSI-RS measurement. In this case, the CSI-RS related measurement symbols may have a lower priority than uplink transmission symbols. Within a CSI-RS search window, a downlink measurement may be performed outside of the symbols designated for uplink transmissions. The downlink measurements may include a RSRP and/or SINR measurement based on CSI-RS symbols and/or a RSRQ measurement based on CSI-RS and/or RSSI symbols.

At 910, RedCap UE 110 may perform at the RedCap UE 110, an uplink transmission using one or more symbols within a CSI-RS search window. This uplink transmission may be prioritized over downlink measurements. A serving cell may inform RedCap UE 110 of the CSI-RS timing information from a neighboring cell. RedCap UE 110 may determine a CSI-RS search window based on this timing. RedCap UE 110 may prioritize the uplink transmissions within the CSI-RS search window. At 915, RedCap UE 110 may perform a CSI-RS measurement within the CSI-RS search window outside of the one or more symbols used for the uplink transmission. For example, RedCap UE 110 may identify one or more symbols within the CSI-RS search window that have not been designated for uplink transmissions.

Figure 10:
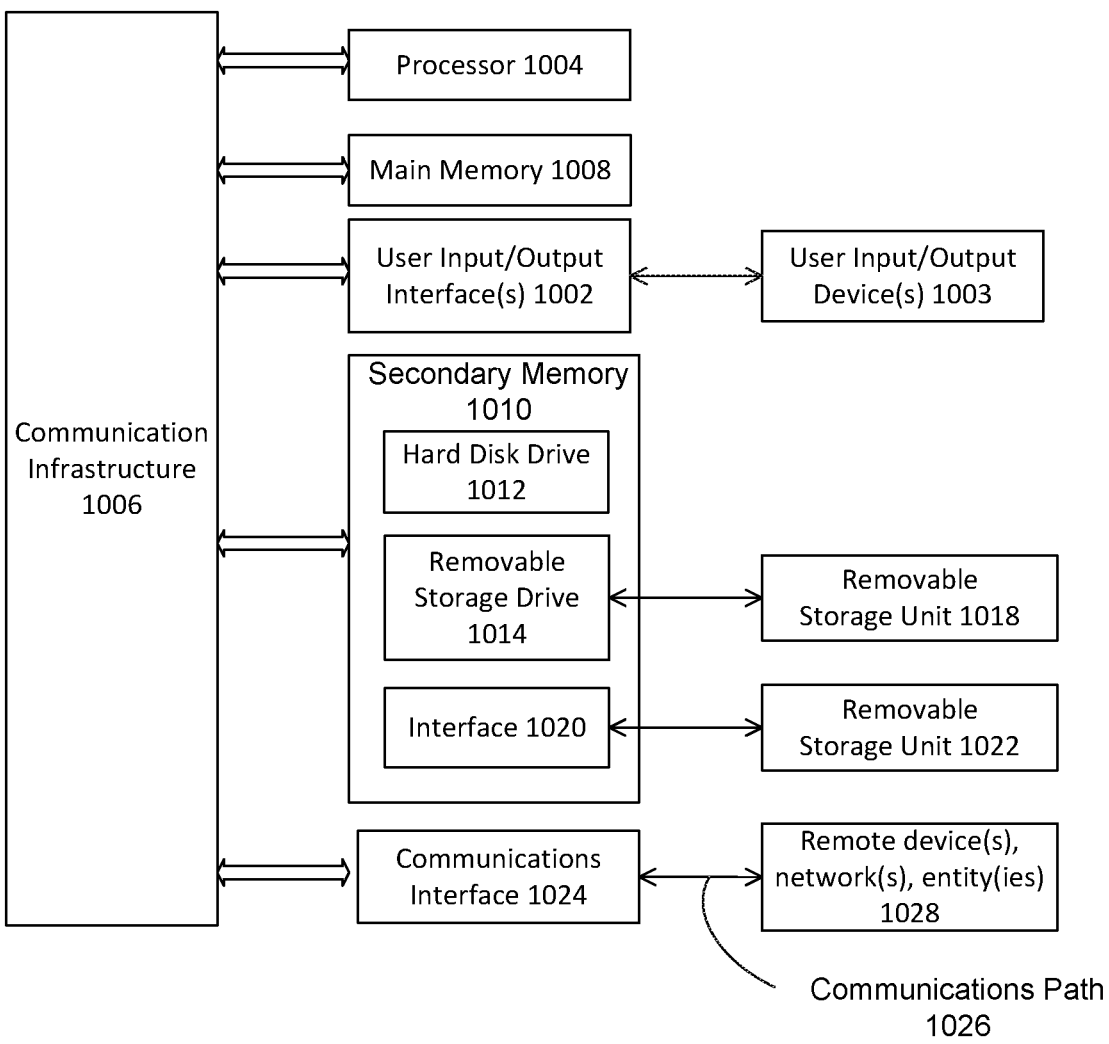
FIG. 10 depicts an example computer system useful for implementing various aspects.

FIG. 10 depicts an example computer system useful for implementing various aspects. Various aspects may be implemented, for example, using one or more well-known computer systems, such as computer system 1000 shown in FIG. 10. One or more computer systems 1000 may be used, for example, to implement any of the aspects discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 10. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A method, comprising:
   determining, at a reduced capacity user equipment (RedCap UE), that a synchronized signal physical broadcast channel block measurement timing configuration (SMTC) window includes a synchronized signal block (SSB) measurement for one or more neighboring cells;
   determining, at the RedCap UE, that a measurement gap is not applied to the SSB measurement for the one or more neighboring cells; and
   in response to determining that the measurement gap is not applied to the SSB measurement for the one or more neighboring cells, prioritizing, at the RedCap UE, the SSB measurement for the one or more neighboring cells in the SMTC window over an uplink transmission from the RedCap UE.

2. The method of claim 1, wherein prioritizing the SSB measurement further comprises:
   determining, at the RedCap UE, that the SMTC window is configured for a Reference Signal Received Power (RSRP) or Signal to Interference and Noise Ratio (SINR) measurement;

determining that SSB timing of a serving cell servicing the RedCap UE is synchronized with a SSB timing of a target neighboring cell of the one or more neighboring cells; and preventing the RedCap UE from performing an uplink transmission during consecutive SSB symbols, a symbol before the consecutive SSB symbols, and a symbol after the consecutive SSB symbols within the SMTC window.

3. The method of claim 2, wherein determining that the SSB timing of the serving cell is synchronized with the SSB timing of the target neighboring cell further comprises:

checking an SSB index flag; and determining that the SSB index flag is enabled.

4. The method of claim 1, wherein prioritizing the SSB measurement further comprises:

determining, at the RedCap UE, that the SMTC window is configured for a Reference Signal Received Power (RSRP) or Signal to Interference and Noise Ratio (SINR) measurement;

determining that SSB timing of a serving cell servicing the RedCap UE is not synchronized with a SSB timing of a target neighboring cell of the one or more neighboring cells; and preventing the RedCap UE from performing an uplink transmission during the SMTC window.

5. The method of claim 4, wherein determining that the SSB timing of the serving cell is not synchronized with the SSB timing of the target neighboring cell further comprises:

checking an SSB index flag; and determining that the SSB index flag is not enabled.

6. The method of claim 1, wherein prioritizing the SSB measurement further comprises:

determining, at the RedCap UE, that the SMTC window is configured for a Reference Signal Received Quality (RSRQ) measurement;

determining that SSB timing of a serving cell servicing the RedCap UE is synchronized with a SSB timing of a target neighboring cell of the one or more neighboring cells; and preventing the RedCap UE from performing an uplink transmission during consecutive SSB symbols, consecutive Received Signal Strength Indicator (RSSI) symbols, a symbol before the consecutive SSB and consecutive RSSI symbols, and a symbol after the consecutive SSB and consecutive RSSI symbols within the SMTC window.

7. The method of claim 1, wherein prioritizing the SSB measurement further comprises:

determining, at the RedCap UE, that the SMTC window is configured for a Reference Signal Received Quality (RSRQ) measurement;

determining that SSB timing of a serving cell servicing the RedCap UE is not synchronized with a SSB timing of a target neighboring cell of the one or more neighboring cells; and preventing the RedCap UE from performing an uplink transmission during the SMTC window.

8. The method of claim 1, wherein the RedCap UE communicates with a base station using half-duplex frequency division duplex (HD-FDD) communications.

9. The method of claim 1, wherein the uplink transmission is a Physical Uplink Control Channel (PUCCH), a Physical Uplink Shared Channel (PUSCH), a Sounding Reference Signal (SRS), or a Random Access Channel (RACH) transmission.

10. A method, comprising:

receiving, at a reduced capacity user equipment (RedCap UE) and from a serving cell, an indication of a Channel State Information Reference Signal (CSI-RS) measurement at a neighboring cell;

determining, at the RedCap UE, that a measurement gap is not applied to the CSI-RS measurement; and in response to determining that the measurement gap is not applied to the CSI-RS measurement, prioritizing, at the RedCap UE, the CSI-RS measurement over an uplink transmission from the RedCap UE.

11. The method of claim 10, wherein prioritizing the CSI-RS measurement further comprises:

determining, at the RedCap UE, that the CSI-RS measurement is a Reference Signal Received Power (RSRP) or Signal to Interference and Noise Ratio (SINR) measurement;

receiving, at the RedCap UE, from the serving cell, a CSI-RS configuration corresponding to the neighboring cell; and preventing the RedCap UE from performing an uplink transmission during consecutive CSI-RS resource symbols of the CSI-RS configuration, a symbol before the consecutive CSI-RS resource symbols, and a symbol after the consecutive CSI-RS resource symbols.

12. The method of claim 10, wherein prioritizing the CSI-RS measurement further comprises:

determining, at the RedCap UE, that the CSI-RS measurement is a Reference Signal Received Power (RSRP) or Signal to Interference and Noise Ratio (SINR) measurement;

receiving, at the RedCap UE, from the serving cell, a CSI-RS configuration corresponding to the neighboring cell;

identifying, at the RedCap UE, a CSI-RS search window including symbols indicated by the CSI-RS configuration; and preventing the RedCap UE from performing an uplink transmission during the CSI-RS search window.

13. The method of claim 10, wherein prioritizing the CSI-RS measurement further comprises:

determining, at the RedCap UE, that the CSI-RS measurement is a Reference Signal Received Power (RSRP) or Signal to Interference and Noise Ratio (SINR) measurement;

receiving, at the RedCap UE, from the serving cell, a CSI-RS configuration corresponding to the neighboring cell;

identifying, at the RedCap UE, a CSI-RS search window including symbols indicated by the CSI-RS configuration; and preventing the RedCap UE from performing an uplink transmission during consecutive CSI-RS resource symbols, a symbol before the consecutive CSI-RS resource symbols, and a symbol after the consecutive CSI-RS resource symbols within the CSI-RS search window.

14. The method of claim 10, wherein prioritizing the CSI-RS measurement further comprises:

determining, at the RedCap UE, that the CSI-RS measurement is a Reference Signal Received Quality (RSRQ) measurement;

receiving, at the RedCap UE, from the serving cell, a CSI-RS and Received Signal Strength Indicator (RSSI) configuration corresponding to the neighboring cell; and preventing the RedCap UE from performing an uplink transmission during consecutive CSI-RS resource symbols of the CSI-RS and RSSI configuration, consecutive RSSI symbols of the CSI-RS and RSSI configuration, a symbol before the consecutive CSI-RS resource and consecutive RSSI symbols, and a symbol after the consecutive CSI-RS and consecutive RSSI symbols.

15. The method of claim 10, wherein prioritizing the CSI-RS measurement further comprises:

determining, at the RedCap UE, that the CSI-RS measurement is a Reference Signal Received Quality (RSRQ) measurement;

receiving, at the RedCap UE, from the serving cell, a CSI-RS configuration corresponding to the neighboring cell;

identifying, at the RedCap UE, a CSI-RS search window including symbols indicated by the CSI-RS configuration; and preventing the RedCap UE from performing an uplink transmission during the CSI-RS search window.

16. The method of claim 10, wherein prioritizing the CSI-RS measurement further comprises:

determining, at the RedCap UE, that the CSI-RS measurement is a Reference Signal Received Quality (RSRQ) measurement;

receiving, at the RedCap UE, from the serving cell, a CSI-RS and Received Signal Strength Indicator (RSSI) configuration corresponding to the neighboring cell;

identifying, at the RedCap UE, a CSI-RS search window including symbols indicated by the CSI-RS and RSSI configuration; and preventing the RedCap UE from performing an uplink transmission during consecutive CSI-RS resource symbols, consecutive RSSI symbols, a symbol before the consecutive CSI-RS resource and consecutive RSSI symbols, and a symbol after the consecutive CSI-RS and consecutive RSSI symbols within the CSI-RS search window.

* * * * *